United States Patent
Ooe et al.

[11] Patent Number: 5,761,498
[45] Date of Patent: Jun. 2, 1998

[54] DISTRIBUTION FILE SYSTEM FOR ACCESSING REQUIRED PORTION OF FILE

[75] Inventors: Kazuichi Ooe; Satosi Inano, both of Kawasaki, Japan

[73] Assignee: Fujitsu Limited, Kawasaki, Japan

[21] Appl. No.: 386,061

[22] Filed: Feb. 7, 1995

[30] Foreign Application Priority Data

Feb. 7, 1994 [JP] Japan .................. 6-013420

[51] Int. Cl.⁶ .................................. G06F 17/30
[52] U.S. Cl. .................. 395/610; 395/601; 395/602; 395/616; 395/200.47; 395/187.01
[58] Field of Search ................ 395/600, 700, 395/200.5, 214, 187.01, 610, 601, 602, 616, 200.47; 364/200

[56] References Cited

U.S. PATENT DOCUMENTS

| | | | |
|---|---|---|---|
| 4,630,196 | 12/1986 | Bednar, Jr. et al. | 364/200 |
| 4,819,159 | 4/1989 | Shipley et al. | 364/200 |
| 5,032,979 | 7/1991 | Hecht et al. | 364/200 |
| 5,325,530 | 6/1994 | Mohrmann | 395/700 |
| 5,465,365 | 11/1995 | Winterbottom | 395/600 |
| 5,497,463 | 3/1996 | Stein et al. | 395/200.03 |
| 5,557,721 | 9/1996 | Fite et al. | 395/148 |

*Primary Examiner*—Thomas G. Black
*Assistant Examiner*—Cheryl R. Lewis
*Attorney, Agent, or Firm*—Staas & Halsey

[57] ABSTRACT

In a file system for use with a parallel computer, a file access system is provided. When a host computer opens a file, it can see it as one file. When each system opens a file, it can see the file as a local file. A substance is stored as one file in a secondary memory. However, in an open mode, each cell can see a required portion.

14 Claims, 29 Drawing Sheets

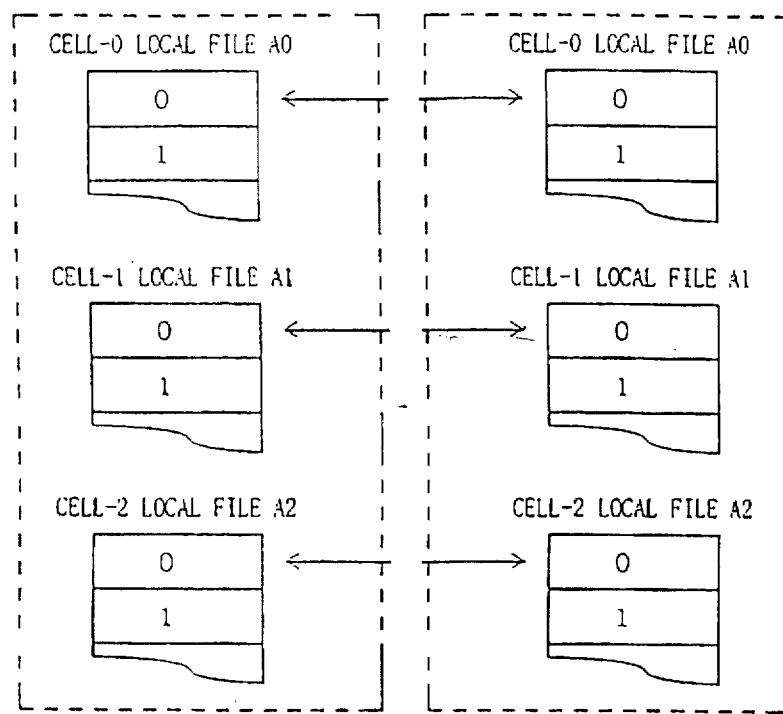
Fig. 1(A) PRIOR ART
OPEN BY HOST COMPUTER OR ANOTHER COMPUTER SYSTEM
Fig. 1(B) PRIOR ART
OPEN BY CELL
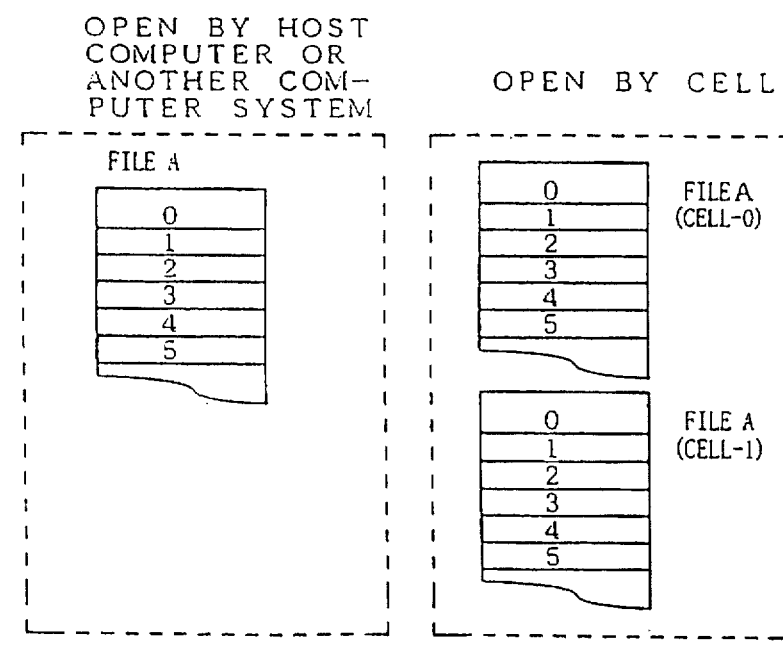
Fig. 1(C) PRIOR ART
OPEN BY HOST COMPUTER OR ANOTHER COMPUTER SYSTEM
Fig. 1(D) PRIOR ART
OPEN BY CELL FIG. 2(A)
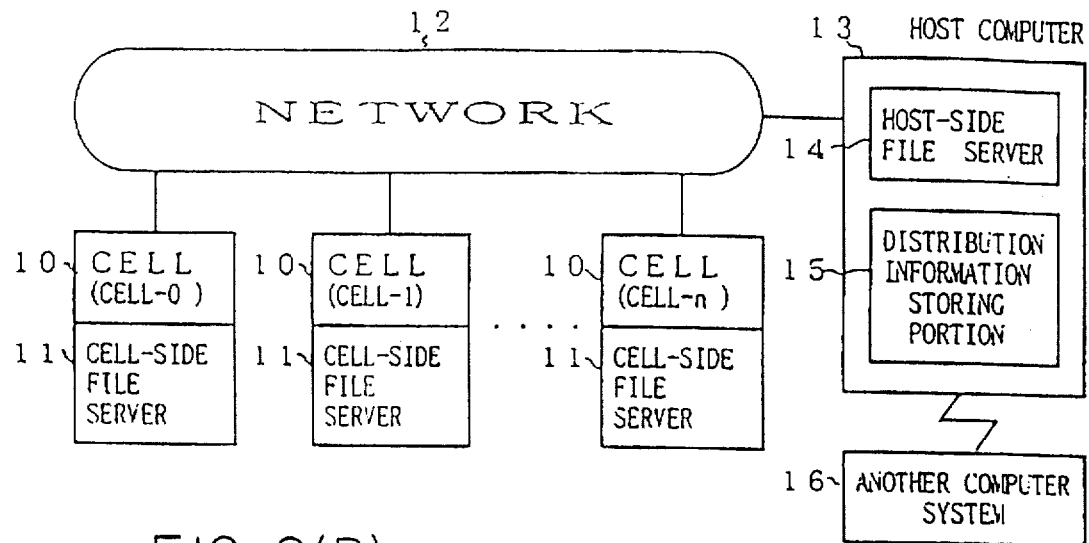
FIG. 2(B)
OPEN BY HOST COMPUTER
OR ANOTHER COMPUTER SYSTEM
FIG. 2(C)
OPEN BY CELL
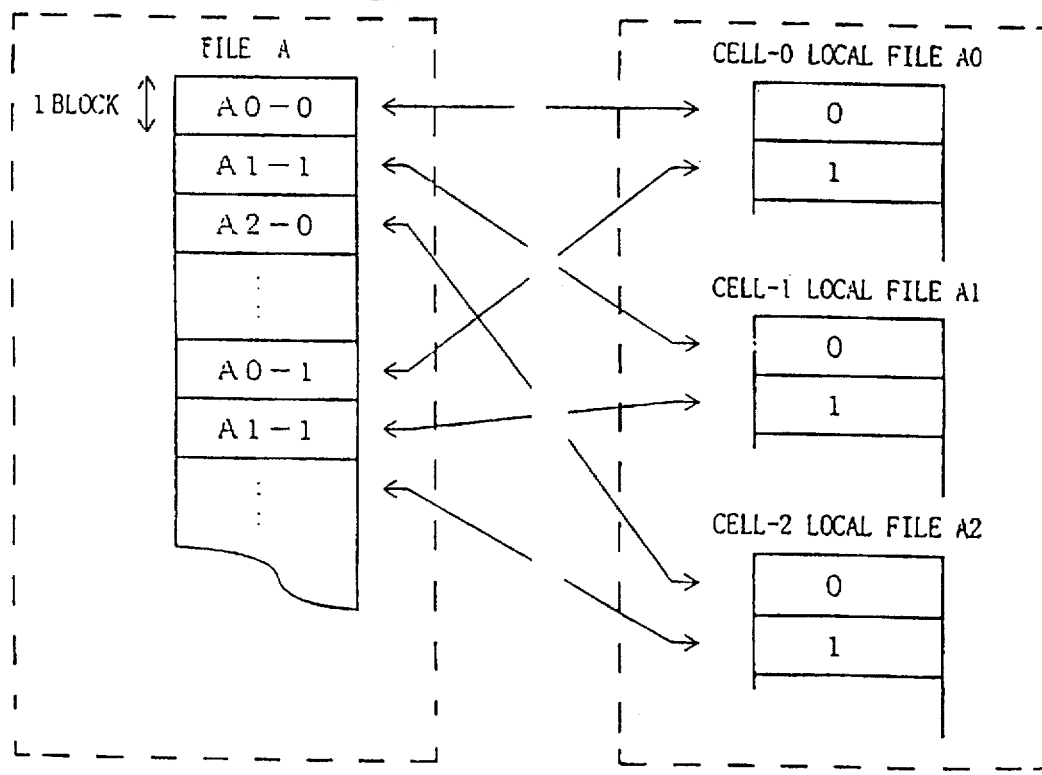

DISTRIBUTION INFORMATION FILE

- FILE NAME OF LOCAL FILE SYSTEM DISTRIBUTED TO EACH CELL (IN THE CASE THAT SUBSTANCE IS PRESENT IN CELL)
- FILE NAME OF HOST (IN THE CASE THAT SUBSTANCE IS PRESENT IN HOST)
- SIDE OF ONE BLOCK
- DISTRIBUTING METHOD
- ORDER

```
host:/home/ap1000/host_file
ncell = 4
block size = 2 KB
mode =cyclic
order = cell ID
```

DISTRIBUTION INFORMATION FILE

Fig. 8B

```
cell0:/home/cell0/file0
cell1:/home/cell1/file1
cell2:/home/cell2/file2
cell3:/home/cell3/file3
ncell=4
block size =2KB
mode=cyclic
order=cell ID
```

Fig. 9B

```
cell0:/home/cell0/file0
cell1:/home/cell1/file1
cell2:/home/cell2/file2
cell3:/home/cell3/file3
ncell=4
block size=1KB
mode=cyclic
order=cell ID
```

Fig. 17B

DISTRIBUTION FILE SYSTEM FOR ACCESSING REQUIRED PORTION OF FILE

BACKGROUND OF THE INVENTION

1. Field of the Invention

The present invention relates to a distribution file system for use with an SPMD (Single Program Multiple Data, etc.) model as an application of a high speed parallel computer.

2. Description of the Related Art

Files systems for use with parallel computers are roughly categorized as a global file system and a local file system.

In the global system, all cells (processor elements) can access the same file. The degree of freedom of the global file system is high. However, when a plurality of cells access the same address of the same file, the consistency of the file should be controlled. Thus, the file system becomes large and the process time thereof becomes slow. In particular, when a task of an SPMD type task is executed, since the probability of which a plurality of cells access the same address of the same file is low, the consistency control for the file is almost meaningless.

On the other hand, in the local file system, each cell has an independent file system. Each cell stores only required data in the local file system. In the local file system, each cell accesses only the local file.

FIG. 1 is a schematic diagram for explaining a related art reference against the present invention. When a host computer accesses a local file of FIG. 1, it sees data distributed to each cell as independent files. FIGS. 1(A) and (B) show an example of a local file system in which a substance of a file is present on the cell side. Files A0, A1, and A2 can be accessed by only cells (cell-0, cell-1, and cell-2), respectively. When the host computer or another computer system accesses these files, it should independently open and access them distributed to each cell.

When each cell accesses a global file, it can access the entire file. FIGS. 1(C) and (D) show an example in the case that a substance of a file is present in the host computer side. Regardless of whether the host computer, another computer system, or each cell opens a file A, it can access the entire file in the same manner.

When the host computer accesses a local file, as shown in FIG. 1(A), it should access it as an independent file with consideration of distribution of data to each local file. When each cell accesses a file of the host computer, as shown in FIG. 1(D), since it can access files that are not required for the process thereof, it should select and access required data. Thus, the load of the data process for the host computer and each cell becomes large.

In the data process of a local file as in an SPMD type parallel computer, when the number of cells is varied, since data processed thereby is changed, data to each local file should be re-distributed, thereby increasing the overhead of the process. In addition, when the distribution conditions that each cell read-accesses data are different from the distribution conditions that each cell write-accesses the same data, the application side should consider the change of the distribution, thereby increasing the process load.

Thus, in the file system for use in the above-described high speed parallel computing environment, the file access efficiency of each cell and host computer becomes critical factor for improving the performance thereof. To improve the file access efficiency, a technique for allowing each cell and host computer to flexibly access only a required portion of a file without increase of load of the application program is required.

SUMMARY OF THE INVENTION

An object of the present invention is to provide a file system having advantageous functions of a global file system and a local file system for one file. Another object of the present invention is to provide a file system for allowing data distribution to each cell to be flexibly changed.

The present invention is a distribution file system for use with a parallel computer system in which a host computer and a plurality of cells are connected through a network, each of the cells having a command executing function, the distribution file system comprising a plurality of file storing means for storing a file that is composed of a plurality of data, a distribution information storing unit for storing distribution information that represents how the data of the file is distributed in the file storing unit, a first access unit for accessing the file as one file corresponding to the distribution information, and a second access unit for accessing the data of the file required by each as a local file corresponding to the distribution information.

According to the present invention, the same file can be accessed as a different local file or as one file without need to change the physical location of the files of each cell.

These and other objects, features and advantages of the present invention will become more apparent in light of the following detailed description of a best mode embodiment thereof, as illustrated in the accompanying drawings.

BRIEF DESCRIPTION OF DRAWINGS

FIGS. 1A, 1B, 1C and 1D are schematic diagrams for explaining a related art reference;

FIG. 2A is a block diagram for explaining a basic construction of the present invention;

FIGS. 2B and 2C are schematic diagrams for explaining a file open state;

FIG. 8B is a table showing the content of a distribution information file in the case of FIG. 8A;

FIG. 9B is a table showing the content of a redistribution information file in the case of FIG. 9A;

FIG. 17B is a table showing the content of a distribution information file;

DESCRIPTION OF PREFERRED EMBODIMENTS

Figure 3:
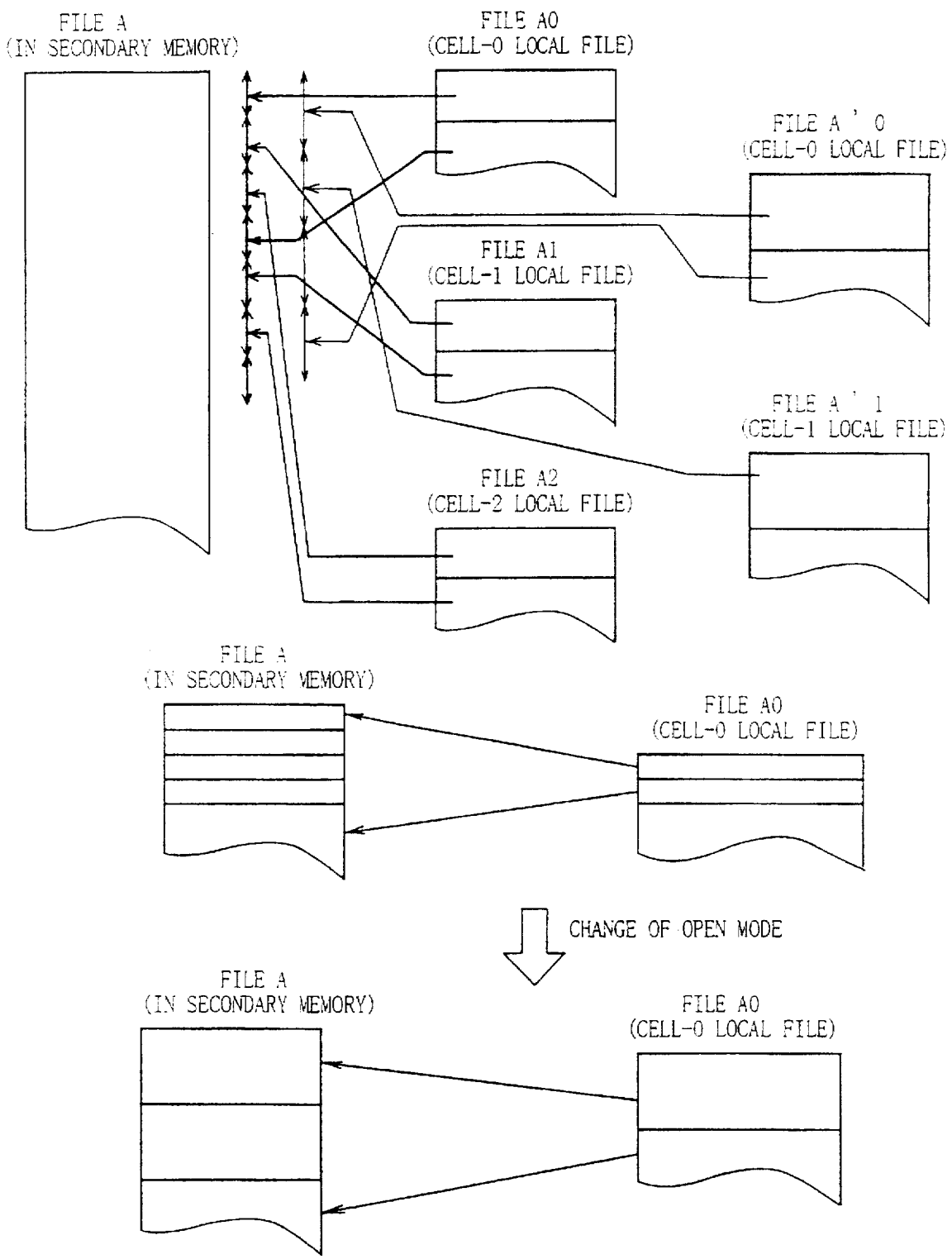
FIG. 3 is a schematic diagram for explaining the theory of the present invention.

Next, with reference to the accompanying drawings, preferred embodiments of the present invention will be described. FIG. 2(A) is a block diagram showing a basic construction of a file system according to the present invention.

The file system comprises a plurality of cells (processor elements) 10, a plurality of cell-side file servers 11, a network 12, a host computer 13, a host-side file server 14, a distribution information storing portion 15, and another computer system 16. Each cell 10 has a command executing function. Each cell-side file server 11 has a file access function. The network 12 connects each cell 10 and the host computer 13. The host-side file server 14 has a file access function. The distribution information storing portion 15 stores data distribution information of a file. The other computer system 16 is connected to the file system through a communication line.

In the file system, when the host computer 13 or the other computer system 16 opens a file A, as shown in FIG. 2B), it can access the file A as one file. On the other hand, when each cell opens the file A, it can open only a required portion corresponding to the distribution information stored in the distribution information storing portion 15 (see FIG. 2C).

In other words, when the host computer 13 accesses the file A, it can access the file A as one file. On the other hand, when each cell 10 accesses the file A, it can access only a required portion.

Next, with reference to FIGS. 3A and 3B, a process in the case that each cell accesses a file A whose substance is stored in a secondary storing medium will be described.

In this case, each cell can access only required data of the file A as a local file. For example, when a cell-0 designates particular access conditions (such as data size, distributing order, and so forth), it can access a file A0 that is a part of the file A as a local file. In addition, when another cell-1 designates access conditions, it can access a file A1 as a local file at the same time.

Moreover, as shown in FIG. 3B, after the cell-0 opens the file, when an open mode (namely, access conditions) is changed, the portion that the cell-0 can see access be changed.

Figure 4:
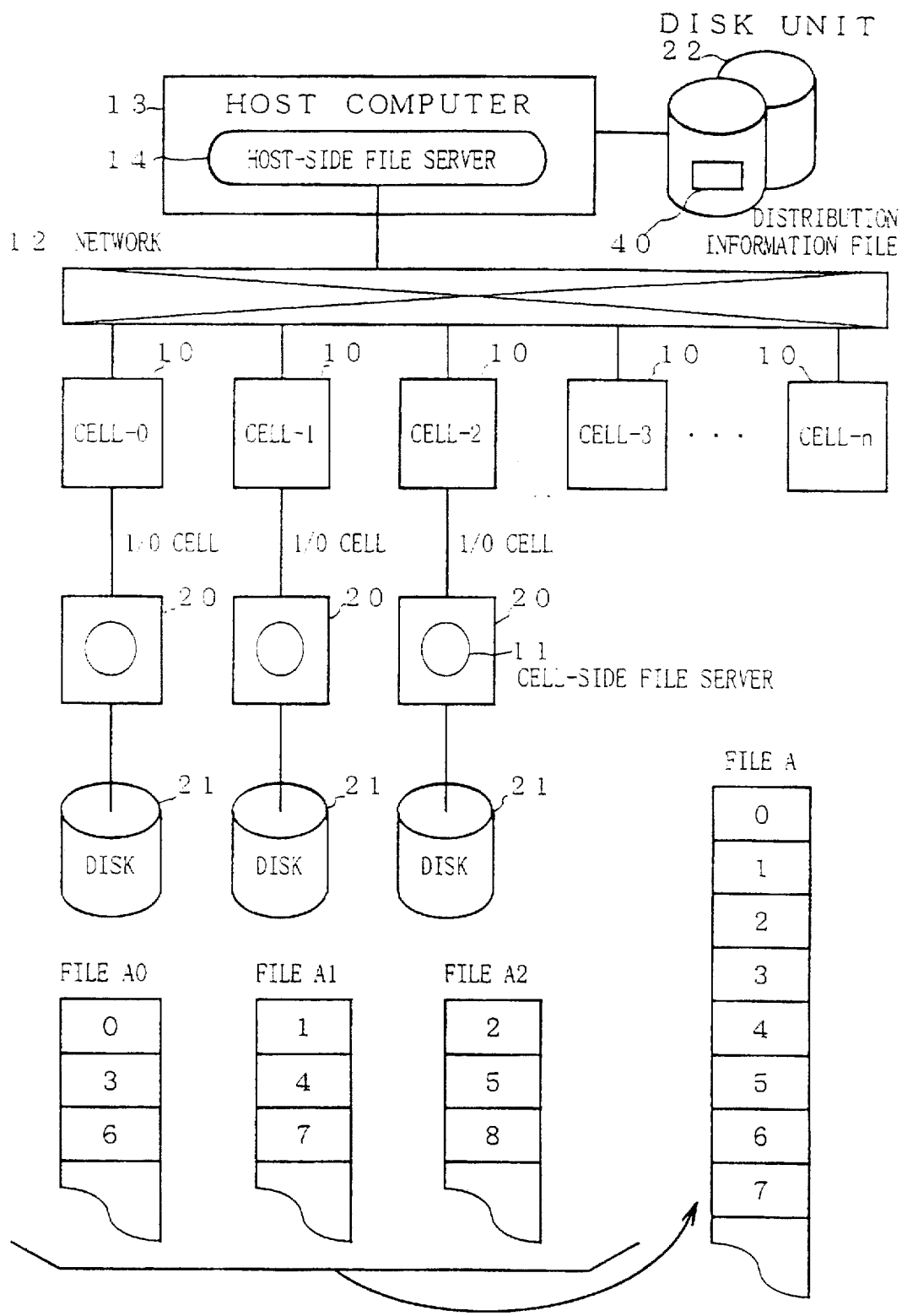
FIG. 4 is a block diagram showing a system construction of an embodiment of the present invention.

FIG. 4 is a block diagram showing a practical example of the system of the present invention. In FIG. 4, a parallel computer system in which a plurality of cells 10 are connected through a network is shown.

The host computer 13 is a conventional general-purpose computer and has a disk unit 22 as an external storage unit that stores a file. Part of cells 10 are connected to disk units 21 that store files through input/output cells 20. Each disk unit 21 has a local file for each cell 10. Each cell 10 that does not have the disk unit 21 has a local file stored in a disk unit 21 of another cell 10.

In the SPMD model, each cell 10 executes the same program with different data. In this case, data that each cell 10 requires is a particular part of the entire data. The data distribution conditions depend on a program that is executed. In addition, even if the same program is executed, the distribution conditions may differ depending on data.

Thus, if a file system in which when the host computer 13 accesses the distributed file, it can access the file as one file and when each cell 10 accesses a file, it can see only a required portion thereof can be accomplished, a file can be easily and effectively accessed. In this case, the distribution of data to each cell 10 should be set corresponding to the distribution of data required by a program to be executed.

To do that, in addition to a file that stores conventional data, a distribution information file 40 that stores information of file distribution is created for the file system of the host computer 13. The distribution information file 40 is referenced when the host computer 13 accesses a file distributed to each cell 10 as one file, when each cell 10 accesses a file of the host computer 13 as a local file, or when a file is exchanged between the host computer 13 and a cell 10.

When a cell 10 has a substance of a file, the cell-side file server 11 is activated. When the host computer 13 has a substance of a file, the host-side file server 14 is activated. Thus, a file is collected or distributed corresponding to the information stored in the distribution information file 40 so as to access or exchange the file.

Next, with reference to FIG. 5, both cases that the host computer has the substance of the file A and the cell has the substance of the file B will be described.

Figures 5A, 5B:
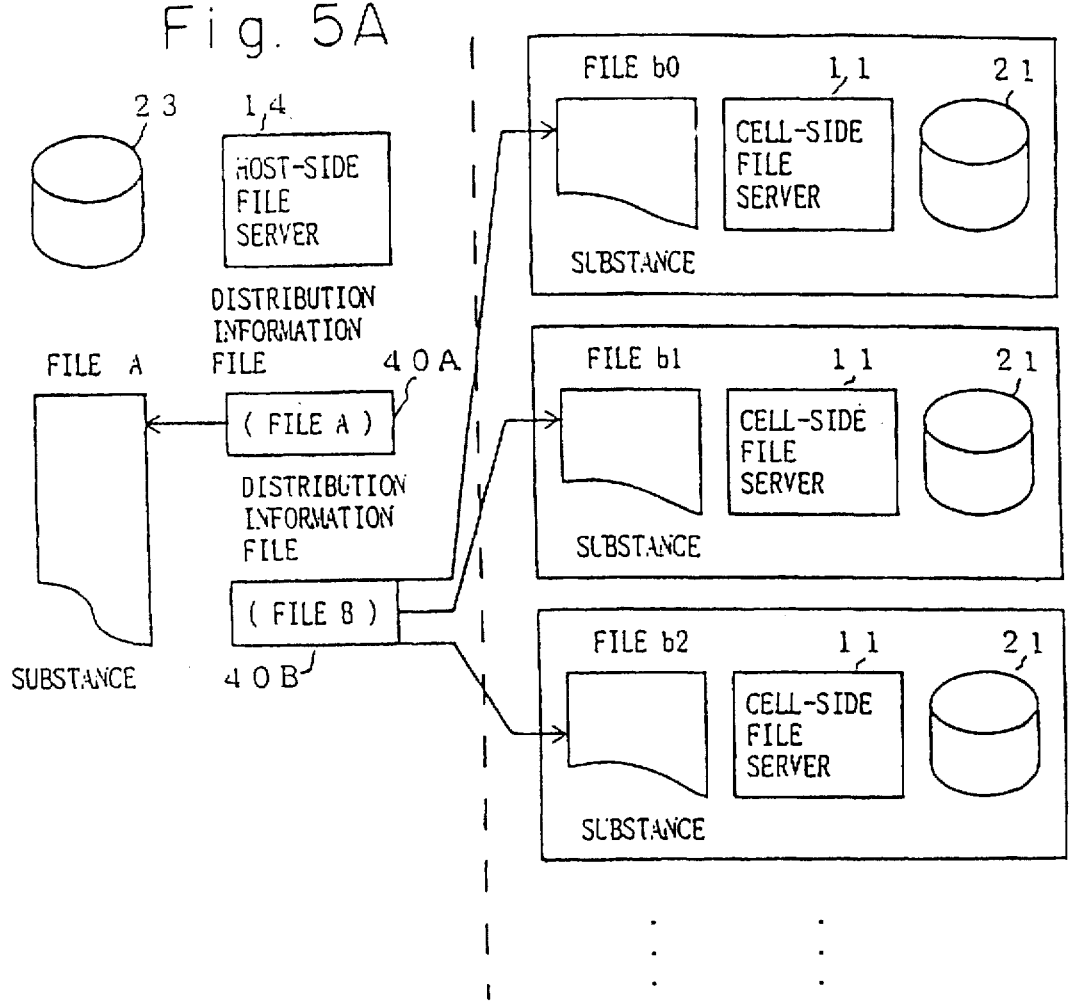
FIG. 5A is a block diagram showing a system construction of the present invention.
FIG. 5B is a schematic diagram for explaining a distribution information file.

In FIG. 5A, the substance of the file A is present in the host computer 13 and the substance of the file B is present in the cell 10. When the cell side accesses the file A, it issues a request to the host-side file server 14. The host-side file server 14 reads a distribution information file 40A of the file A and sends a required portion to each cell 10 corresponding to the distribution information file 40A. Each cell 10 uses the received portion as a continuous file.

When the cell 10 accesses the file B, it accesses the local file that stores a required portion. When the cell 10 accesses a file with different distribution conditions, the cell-side file server 11 reads a distribution information file 40B through the host-side file server 14, exchanges data that each cell 10 has between the cell-side file servers 11, rearranges the data corresponding to designated distribution information and outputs the resultant data to a user task. When the number of cells varies, the data distribution conditions are changed in the above-described manner and data is output to the user task.

When the host computer 13 accesses the file B, it issues the request to the host-side file server 14. The host-side file server 14 accesses the local file of each cell 10 through the cell-side file server 11 and collects/distributes data corresponding to the distribution information file 40B for the file B.

As shown in FIG. 5(B), the information stored in the distribution information files 40A and 40B are (a) the file name in the local file system distributed to each cell 10 (in the case that the substance of the file is present in the cell 10), (a)' the file name managed by the host computer 13 (in the case that the substance of the file is present in the host computer 13), (b) the size of one block, (c) distributing method, (d) the distributing order, and so forth.

The distributing method in (c) represents the data designating method such as round-robin order, hash, and so forth. The distributing order in (d) represents the order of cells.

The distribution information files 40A and 40B are used to distribute/collect data when the host-side file server 14 accesses substantial data. A user task that accesses a file does not need to consider the distribution information files 40A and 40B. The host-side file server 14 obtains the distribution information file name from a conversion table that has been set corresponding to the path name designated by the user. When the file is distributed to the cell 10 side, the substance of the file is stored in the local file system of each cell 10.

Figure 6:
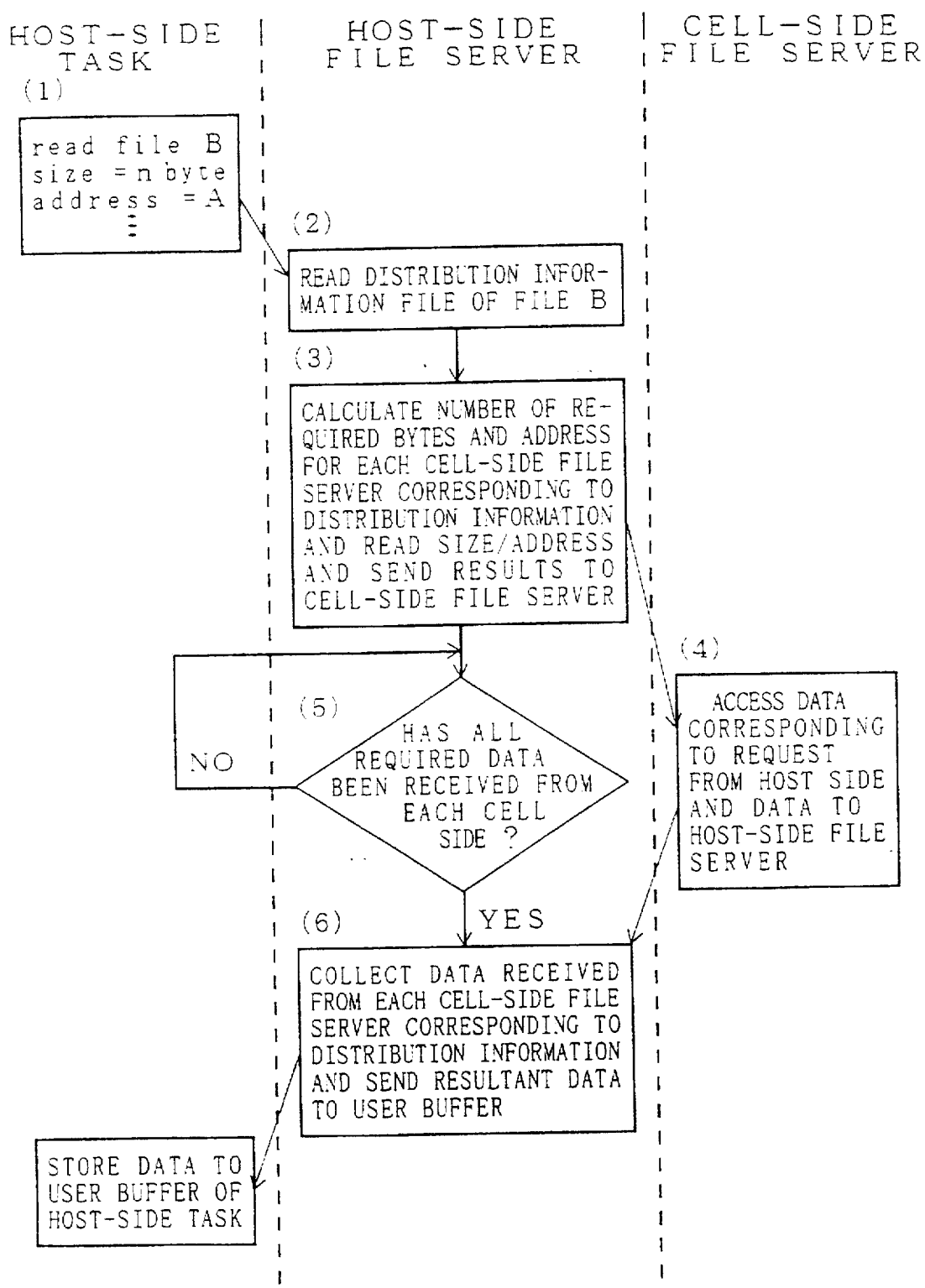
FIG. 6 is a flow chart showing the process of a file server in the case that a host side reads a file from a cell side.

FIG. 6 is a flow chart showing a process of the file server in the case that the host side reads the file B (b0, b1, b2, ... ) from the cell side in a file environment shown in FIG. 5(A).

(1) A host-side task issues a read request of the file B whose substance is present on the cell side. At this point, for example, the data read size and address are designated as "n bytes" and "A", respectively.

(2) The host-side file server 14 reads the distribution information file 40B of the file B.

(3) Thereafter, the host-side file server 14 calculates the number of required bytes and address for the each cell-side file server 11 corresponding the distribution information retrieved from the distribution information file 40B, the read size "n bytes", and the address "A" and issues a read request to each cell-side file server 11.

(4) Each cell-side file server 11 accesses related data of the file B distributed corresponding to the request received from the host side and sends the data to the host-side filer server 14.

(5) The host-side file server 14 determines whether or not the required data has been received from each cell. When the determined result is YES, the flow advances to the next step (6).

(6) The host-side file server 11 collects the data received from each cell-side file server 11 corresponding to the distribution information and sends the resultant data to a user buffer designated by the host-side task.

Figure 7:
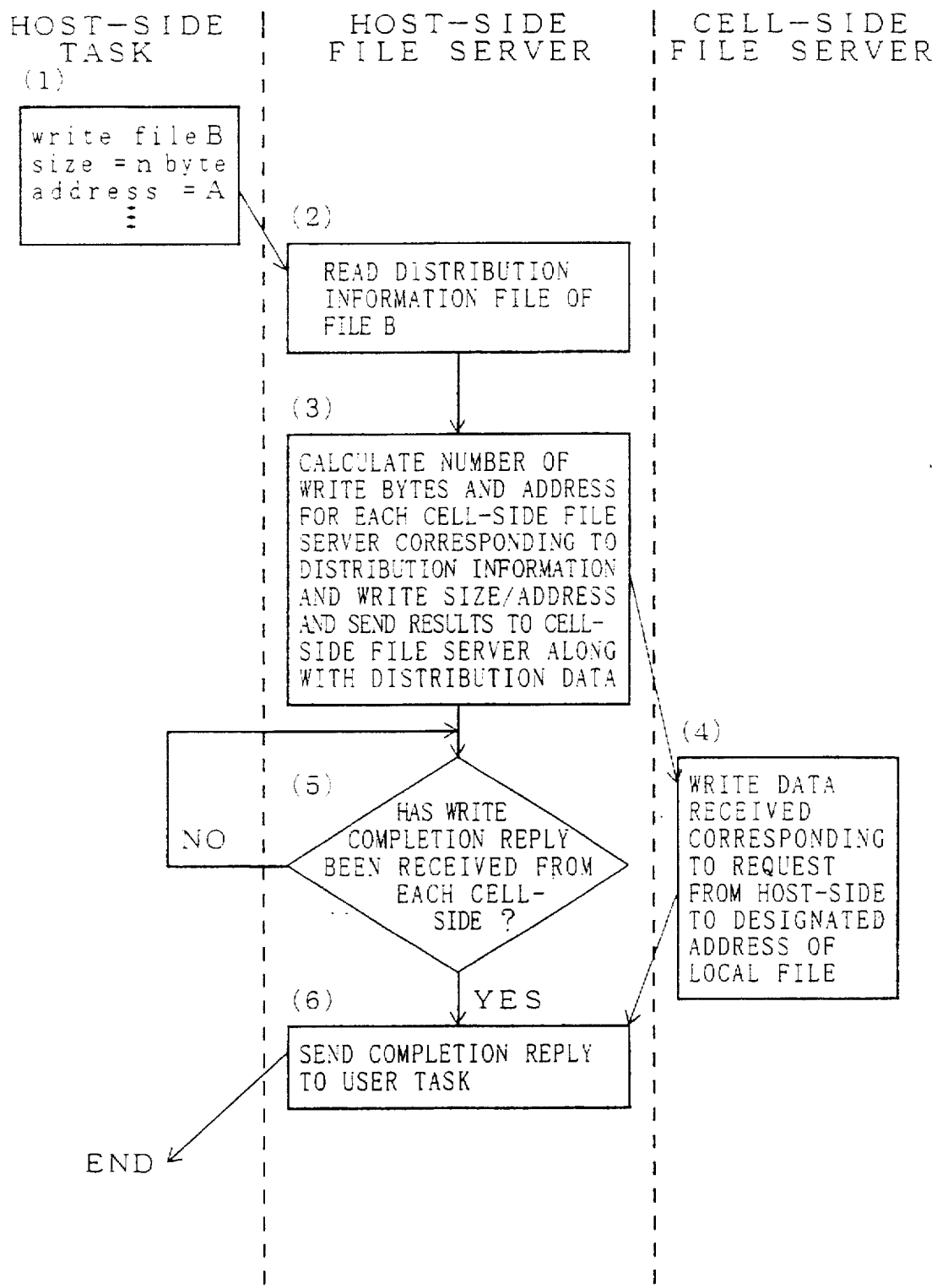
FIG. 7 is a flow chart showing the process of the file server in the case that the host side writes a file to the cell side.

FIG. 7 is a flow chart showing a process of the host-side file server 14 in the case that the host side writes data to the file B on the cell side in a file environment shown in FIG. 5(A).

(1) The host-side task issues a write request of the file B whose substance is present on the cell side. At this point, the data write size and write address are designated as "n bytes" and "A", respectively.

(2) The host-side file server 14 reads the distribution information file 40B of the file B.

(3) Thereafter, the host-side file server 14 calculates the number of write bytes and address for each cell-side file server 11 corresponding to the distribution information retrieved from the distribution information file 40B, the write size "n bytes", and the address "A" and sends a write request to each cell-side file server 11 along with the distribution information.

(4) Each cell-side file server 11 writes the received data to the designated address of the local file corresponding to the request received from the host side.

(5) The host-side file server 14 monitors the reply from each cell side. When the host-side file server 14 has received write completion reply from all the cells, the flow advances to the next step (6).

(6) The host-side file server 14 sends a write completion reply to the requesting user task. Thus, the write process is completed.

Next, with reference to FIGS. 8A, 8B, 9A and 9B, practical examples in the case that the substance of a file is present on the host side and the substance of a file is present on the cell side will be described.

Figure 8A:
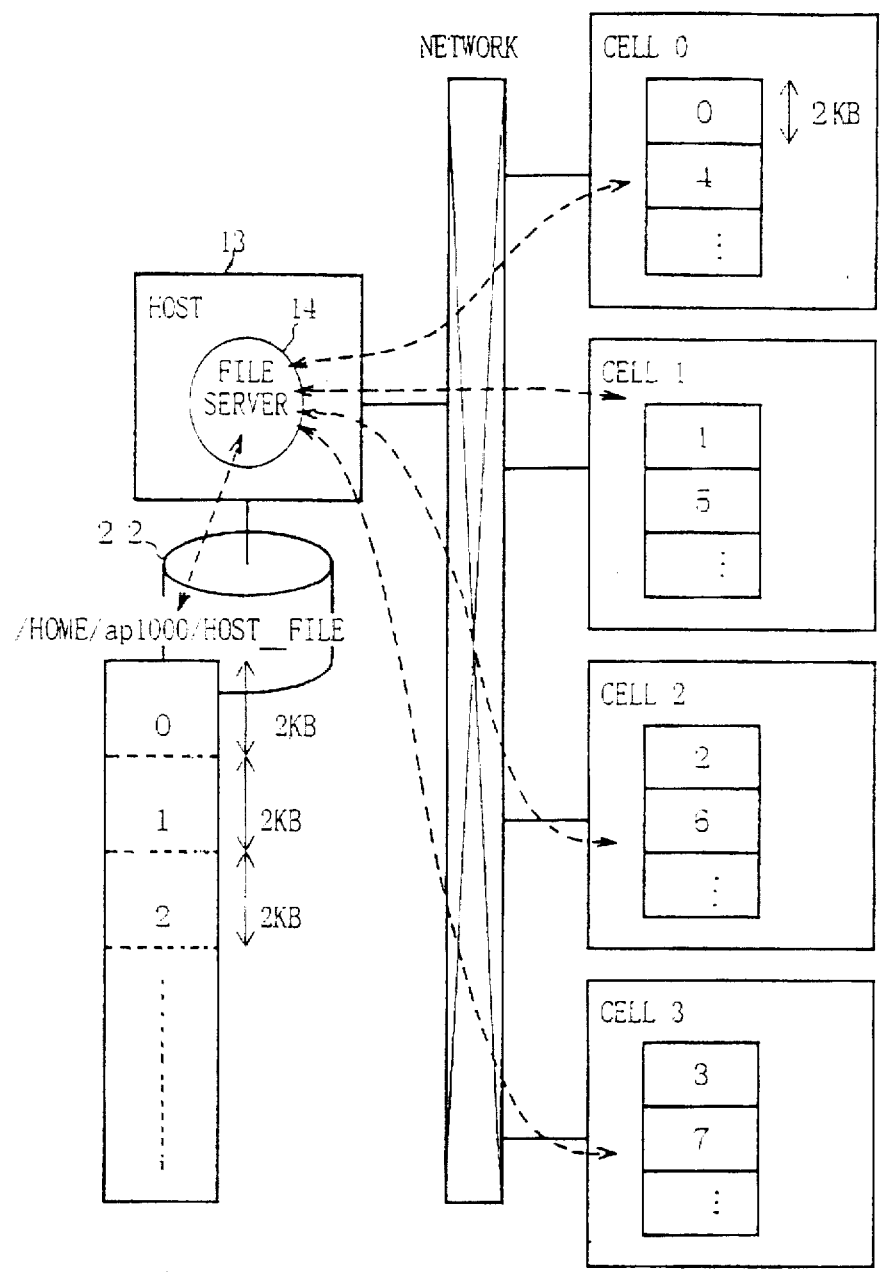
FIG. 8A is a schematic diagram for explaining the process of which the host side accesses a file.

FIG. 8A is a schematic diagram for explaining a process in the case that the host side issues a read request of the file B whose substance is present on the cell side. FIG. 8B is a table showing the content of a distribution information file in the case of FIG. 8A.

The file data is distributed to the disk unit 21 connected to each cell 10 corresponding to the designated distributing method, designated order, and designated unit (in the case shown in FIG. 8, "cyclic", "order of cells", and "2 KB").

For example, the first 2 KB data of the file B is stored in the cell (cell 0) (this data is referred to as data "0"). The next 2 KB data of the file B is stored in the cell (cell 1) (data "1"). Likewise, 2 KB data is stored in each of the cells (cell 2) and (cell 3) (data "2" and "3"). After the cell 3, the next 2 KB data is stored in the cell (cell 0) (data "4").

At this point, as shown in FIG. 8(B), information that represents that the number of cells is "4", the block size is "2 KB", the distributing method is "cyclic", and the order is "cell ID order" is stored in the distribution information file.

The host-side file server 14 can read a data group distributed to each cell 10 from the distribution information stored in the distribution information file as one file.

Figure 9A:
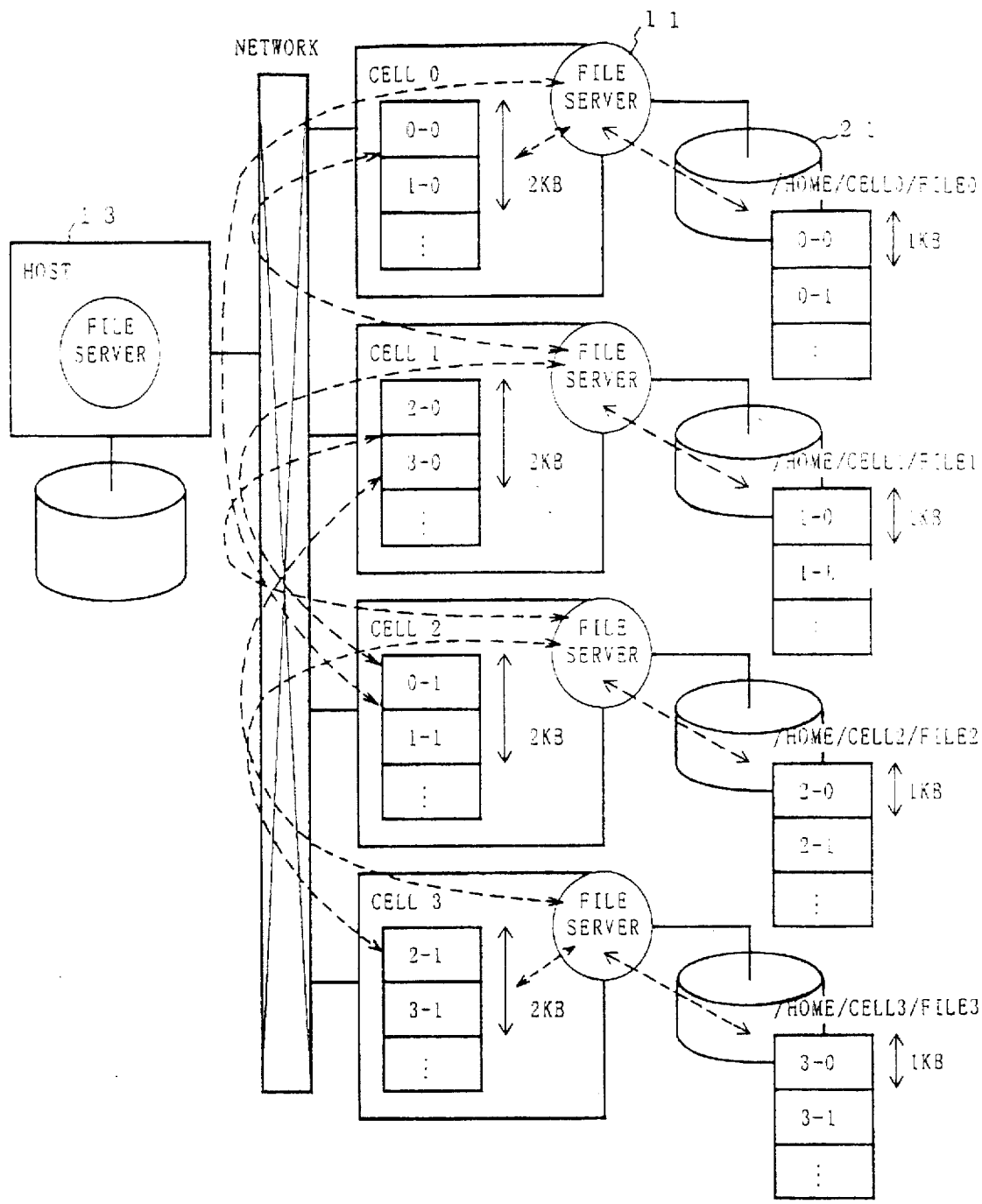
FIG. 9A is a schematic diagram for explaining the process of which the cell side accesses a file.

FIG. 9A is a schematic diagram for explaining a process in the case that the cell 10 issues a read request for a file whose substance is present in the cell 10. FIG. 9B is a table showing the content of a re-distribution information file in the case of FIG. 9A.

In this case, file data (as blocks of 1 KB) is stored in the disk unit 21 of each unit 10. The first 1 KB data of the file B is stored in the cell (cell 0) (this data is referred to as "0-0"). The next 1 KB data of the file B is stored in the cell (cell 1) (data "1-0"). Likewise, 1 KB data is stored in each of the cells (cell 2) and (cell 3) (data "2-0" and "3-0"), respectively. After the cell (cell 3), the next 1 KB data is stored in the cell (cell 0) (data "0-1").

At this point, as system-side distribution information (not shown), the number of cells "4", the block size "1 KB", the distributing method "cyclic", and distributing order "cell number order" are stored.

When a user task issues a data read request with data distribution different from the physical distribution information on the system side, the file server 11 of each cell reads data corresponding to the distribution information designated by the user task (this distribution information is referred to as redistribution information) and the system distribution information and sends the read data to the user task.

For example, the 1 KB data "0-0" managed by the file server 11 of the cell (cell 0) and the 1 KB data "1-0" managed by the file server 11 of the cell (cell 1) are sent to the user task of the cell (cell 0). The 1 KB data "2-0" managed by the file server 11 of the cell (cell 2) and the 1 KB data "3-0" managed by the file server 11 of the cell (cell 3) are sent to the user task of the cell (cell 1). Likewise, the same data sending process is performed and the data with the data distribution designated by the use task can be read.

Next, a process in the case that distribution conditions of data of a local file whose substance is present on the cell side are changed will be described.

Figure 10:
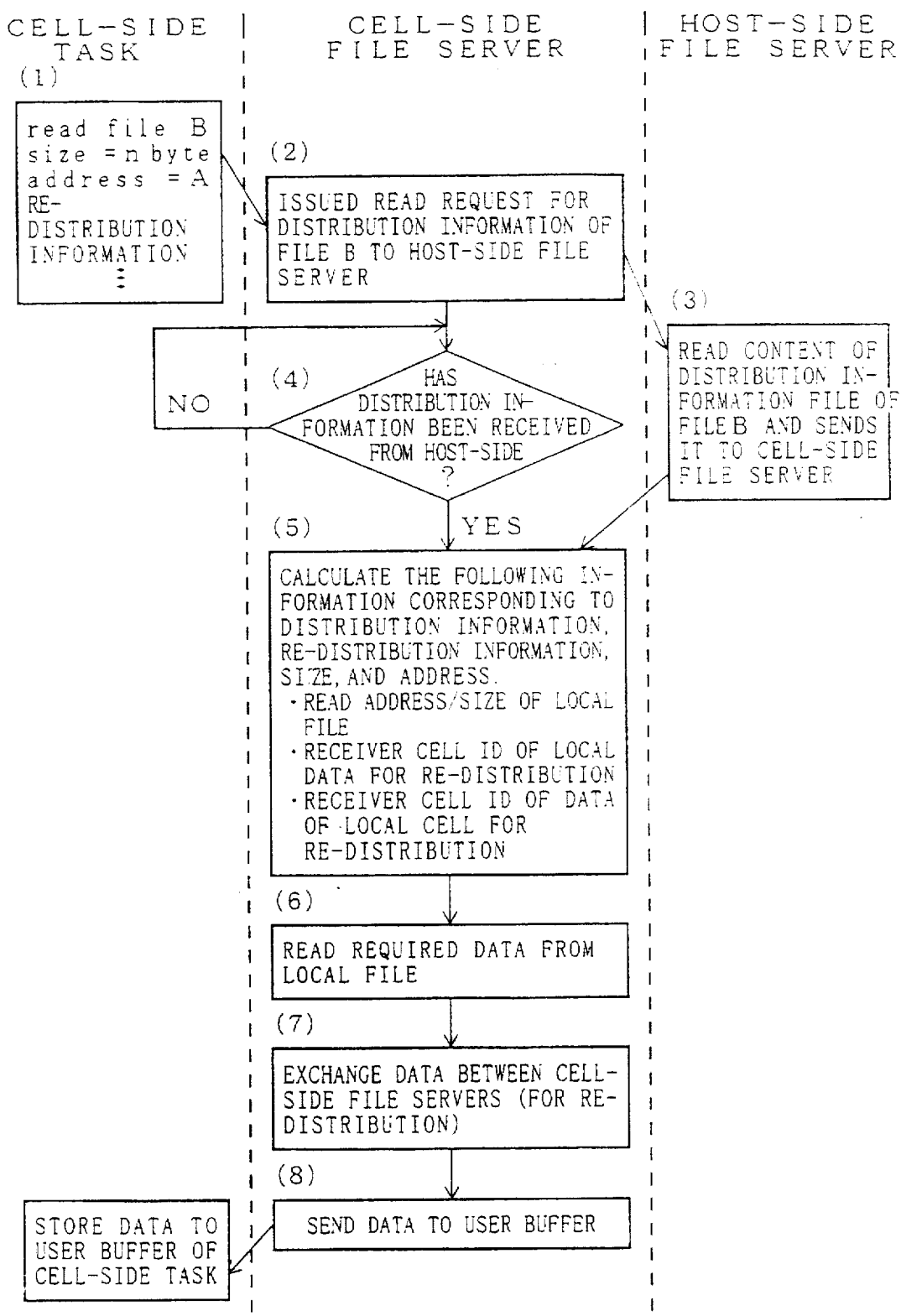
FIG. 10 is a flow chart showing a process of the file server in the case that distribution conditions of data of a file whose substance is present on the cell side are changed and the data is read-accessed.

FIG. 10 is a flow chart showing a process of the file server in the case that distribution conditions of a file B whose substance is present on the cell side in a file environment shown in FIG. 5(A) are changed and the file B is read-accessed.

(1) When a cell-side task issues a read request of the file B whose substance is present on the cell side, it designates re-distribution information along with the read size "n bytes" and the read address "A".

(2) The cell-side file server 11 issues a read request for the distribution information file 40B of the file B to the host-side file server 14.

(3) The host-side file server 14 reads the content of the distribution information file 40B corresponding to the request and sends the content to the sell-side file server 11.

(4) The cell-side file server 11 monitors a reply from the host-side file server 14. When the cell-side file server 11 has received the distribution information from the host-side file server 14, the flow advances to the next step (5).

(5) The cell-side file server 11 calculates the following information corresponding to the distribution information received from the host-side file server 14, the re-distribution information designated when the read request was issued, the size, is and the read address. The calculated information is (a) read address/size in the local file system, (b) receiver cell ID of data of the local file, and (c) sender cell ID from which the local cell receives data for re-distribution.

(6) The cell-side file server 11 reads required data from the local file.

(7) Data is exchanged (re-distributed) between the cell-side file servers 11 of the cells 10.

(8) The cell-side file server 11 sends the resultant data obtained by the re-distribution to the user buffer of the cell-side task. Thus, the process for the read request is completed.

Figure 11:
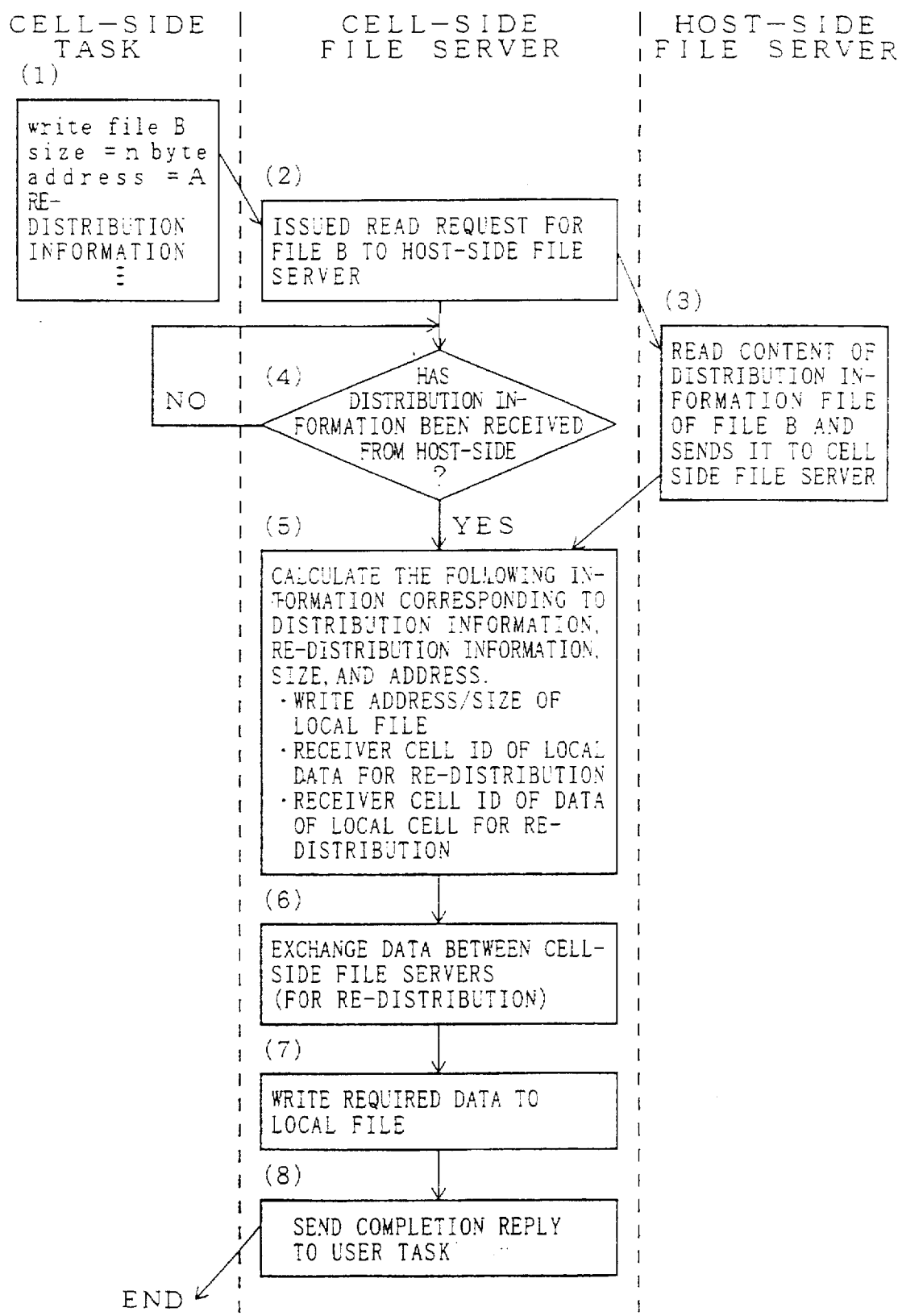
FIG. 11 is a flow chart showing a process of the file server in the case that distribution conditions of data of a file whose substance is present on the cell side is changed and the data is write-accessed.

FIG. 11 is a flow chart showing a process of the file server in the case that distribution conditions of the file B whose substance is present on the cell side in the file environment shown in FIG. 5A are changed and the file B is write-accessed.

(1) When the cell-side task issues a write request for the file B whose substance is on the cell side, it designates re-distribution information along with the write size "n bytes" and the write address "A".

(2) The cell-side file server 11 issues a read request for the distribution information file 40B of the file B to the host-side file server 14.

(3) The host-side file server 14 reads the content of the distribution information file 40 corresponding to the received request and sends the content to the cell-side file server 11.

(4) The cell-side file server 11 monitors a reply from the host-side file server 14. When the cell-side file server 11 has received the distribution information from the host-side file server 14, the flow advances to the next step (5).

(5) The cell-side file server 11 calculates the following information corresponding to the distribution information received from the host-side file server 14, the re-distribution information designated when the write request was issued, the size, and the write address. The calculated information is (a) write address/size in the local file system, (b) receiver cell ID of the data of the local file for re-distribution, and (c) sender cell ID of data received by the local cell for redistribution.

(6) Data is exchanged (re-distributed) between the cell-side file servers 11 of the cells corresponding to the above-described information.

(7) The cell-side file server 11 writes required data to the local file.

(8) When the data has been written, the cell-side file server 11 informs the requesting user task of a write completion reply. Thus, the process for the write request is completed.

Figure 12:
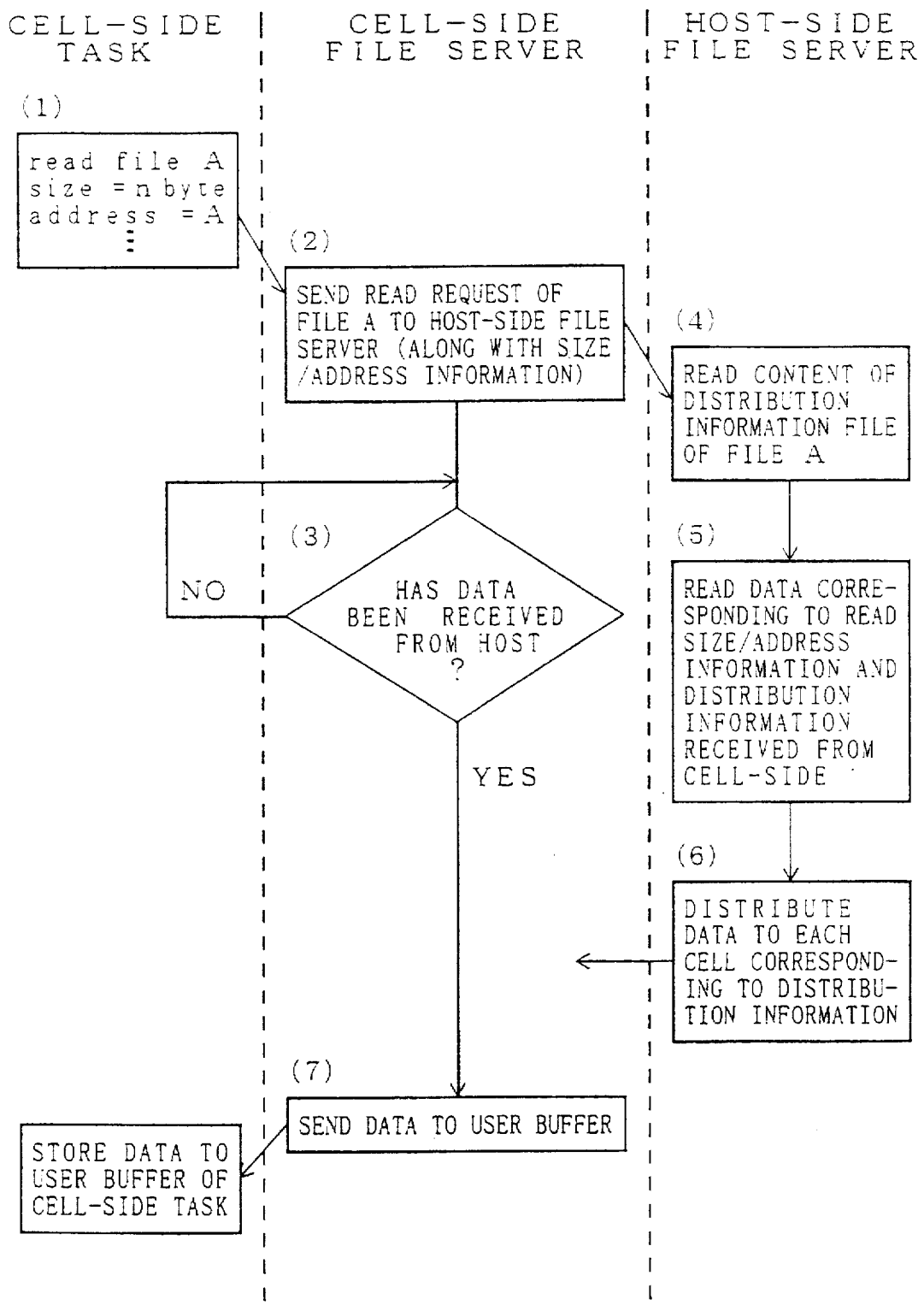
FIG. 12 is a flow chart showing a process of the file server in the case that distribution conditions of data of a file whose substance is present on the host side is changed and the data is read-accessed from the cell side.

FIG. 12 is a flow chart showing a process of the file server in the case that the cell-side read-accesses the file A whose substance is present on the host side in the file environment shown in FIG. 5(A).

(1) When the cell-side task issues a read request of the file A whose substance is present on the host-side, it designates the read size "n bytes" and the read address "A".

(2) When the cell-side file server 11 has received the write request, it sends a read request of the file A to the host-side file server 14 along with the designated size and address information.

(3) Thereafter, the cell-side file server 11 waits for data from the host side.

(4) The host-side file server 14 reads the distribution information file 40A of the file A corresponding to the read request.

(5) The host-side file server 14 retrieves data from the file A corresponding to the read size and address information received from the cell side and the distribution information retrieved from the distribution information file 40A.

(6) After the host-side file server 14 has read the data, it distributes the data to each cell 10 corresponding to the distribution information.

(7) The cell-side file server 11 sends the data received from the host-side file server 14 to the user buffer of the cell-side task. Thus, the process for the read request is completed.

Figure 13:
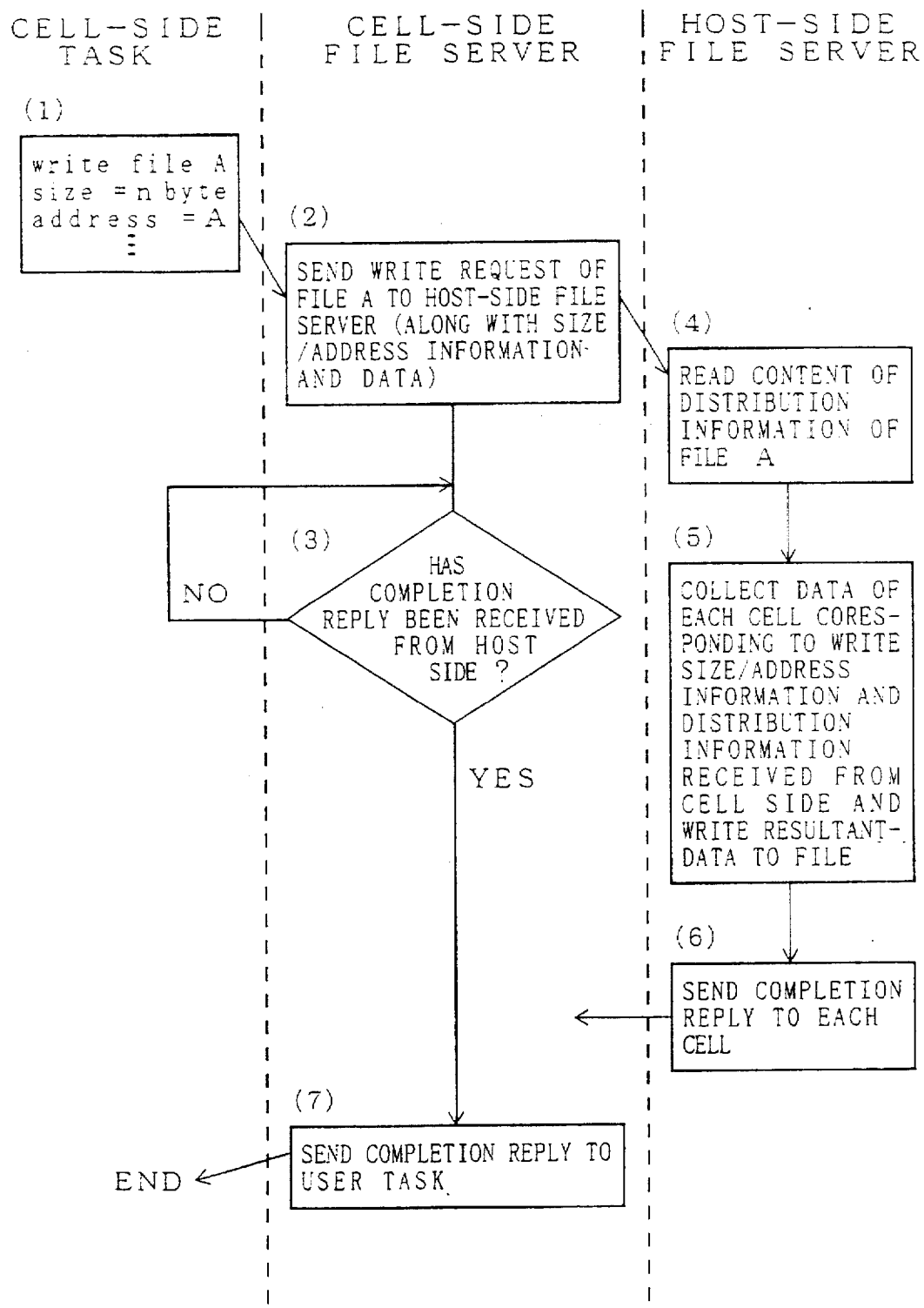
FIG. 13 is a flow chart showing a process of the file server in the case that distribution conditions of data of a file whose substance is present on the host side is changed and the data is write-accessed from the cell side.

FIG. 13 is a flow chart showing a process of the file server in the case that the cell side write-accesses the file A whose substance is present on the host side in the file environment shown in FIG. 5A.

(1) When a cell-side task issues a write request of the file A whose substance is present on the host side, it designates the read size "n bytes" and the write address "A".

(2) When the cell-side file server 11 has received the write request, it issues a write request of the file A to the host-side file server 14 along with the designated size and address information.

(3) Thereafter, the cell-side file server 11 waits for a completion reply from the host side.

(4) The host-side file server 14 reads the distribution information file 40A of the file A corresponding to the write request.

(5) The host-side file server 14 collects data received from each cell 10 corresponding to the write size and address information received from the cell side and the distribution information received from the distribution information file 40A and writes the resultant data to the file A.

(6) After the host-side file server 14 has written the data to the file A, it sends a completion reply to each cell 10.

(7) When the cell-side file sever 11 has received the completion replay from the host-side file server 14, it sends the completion reply to the requesting user task. Thus, the process for the write request is completed.

Next, with reference to FIGS. 14 to 16, processes of the host-side and cell-side file servers in the case that a cell 10 accesses data distributed to each cell 10 as one local file and a process of the cell-side file server in the case that data is re-distributed will be described.

In the following description, the data distributing method and the data distributing order are "cyclic" and "cell number order", respectively. A table that correlates the file identifier "fd" that is uniquely assigned to a file and the content of the distribution information file is stored in the host-side file server. The content of the distribution information file is stored in the table. In addition, the number of distributed cells is "NCELL", the size of one block is "B_SIZE", and the data access size for each cell requested from the cell 10 side is a multiple of B_SIZE.

When the host-side file server 14 receives a command in which the command type is "read", the file identifier is "fd", and the cell access size is "size" from the cell 10 (at step S10 of FIG. 14), the host-side file server 14 retrieves the file distribution information from the designated file identifier corresponding to the designated file identifier and obtains information such as the number of cells, the block size, the mode (data distributing method), and the distributing order (at step S11).

Next, the number of loop times for reading the data of the size designated by the user task is calculated corresponding to the equation "N=(size+B_SIZE-1)/B_SIZE". In addition, an initial value "0" is set to a register "cell" and a register "n" (at step S12). The data of "B_SIZE" is read from a file designated by the file identifier "fd" (at step S13). The read data is sent to a cell with a cell ID designated by the register "cell" (at step S14). Thereafter, it is determined whether or not the value of the register "cell" is equal to the value of which the number of distributed cells "NCELL" designated by the user task from which "1" is subtracted (at step S15). This is because the initial value of the register "cell" is "0".

When the determined result at step S15 is cell ≠NCELL-1 (namely, NO at step S15), the value of the register "cell" is incremented by "1" (at step S16). Thereafter, the flow returns to step S13.

On the other hand, when the determined result at step S15 is "cell=NCELL-1", "0" is set to the register "cell" (at step S17). Thereafter, it is determined whether or not the value of the register "n" is equal to the value of which "1" is subtracted from the number of loop times N. When the value of the register "n" is not equal to "N-1" (namely, the determined result is NO at step S18), the value of the register "n" is incremented by "1" (at step S19). Thereafter, the flow returns to step S13. Thus, steps S13 to S19 are repeated.

Figure 15:
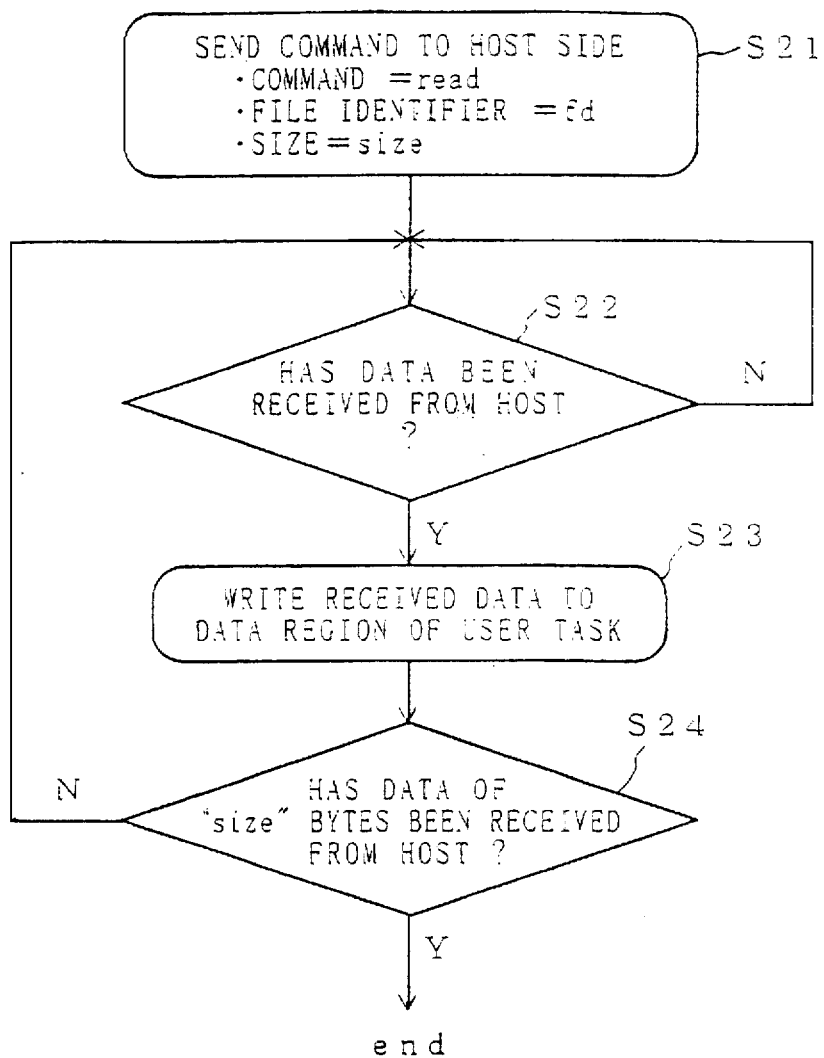
FIG. 15 is a flow chart showing a process of the cell-side file server in the case that distributed data is accessed as one local file from a cell.

On the other hand, the cell-side file server 11 sends the command "read", the file identifier "fd", and the data access size "size" designated by the user task to the host-side file server 14 (at step S21 of FIG. 15). It is determined whether or not data has been received from the host-side file server 14 (at step S22). When the determined result at step S22 is YES, the received data is written to a data region of the user task (at step S23). Thereafter, it is determined whether or not the data for the access size "size" designated by the user task has been received from the host (at step S24). When the determined result is NO, the flow returns to step S22. When the determined result is YES, the process is completed.

Next, with reference to a flow chart of FIG. 16, a process of the cell-side file server 11 in the case that data distributed to a cell is re-distributed so that the cell can access the data as a local file will be described.

Figure 14:
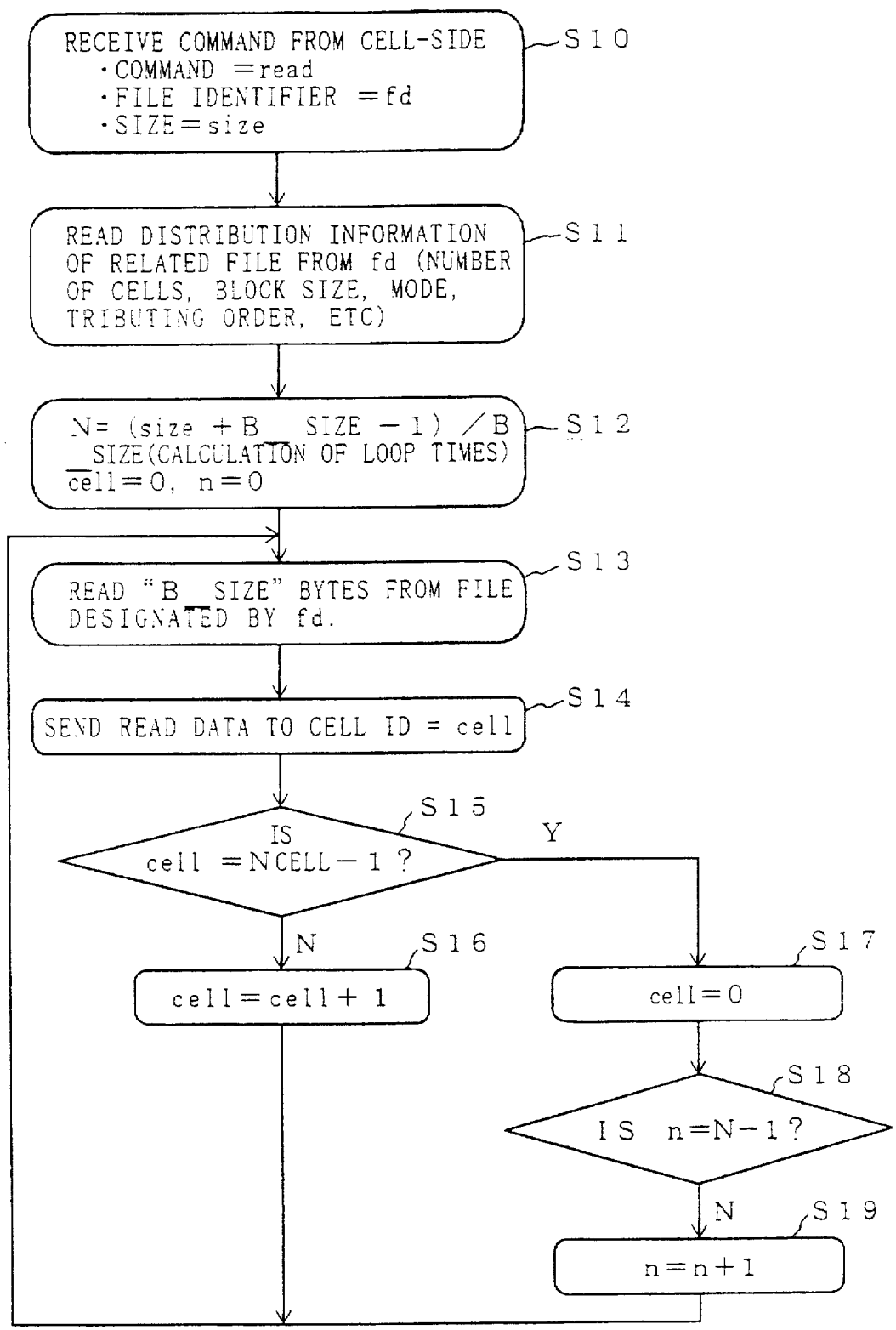
FIG. 14 is a flow chart showing a process of the host-side file server in the case that distributed data is accessed as one local file from a cell.

In this process, the data distributing method and the data distributing order are the same as those shown in FIGS. 14 and 15. In addition, the cell access size is "size", the number of distributed cells designated by a user task is "NCELL", and the size of one block is "B_SIZE". Moreover, the number of physical distributions of file data is "NDISK" and the block size is "D_SIZE". The physical distributing order is "cell number order" in which data is arranged from the disk unit of the cell 0.

Figure 16:
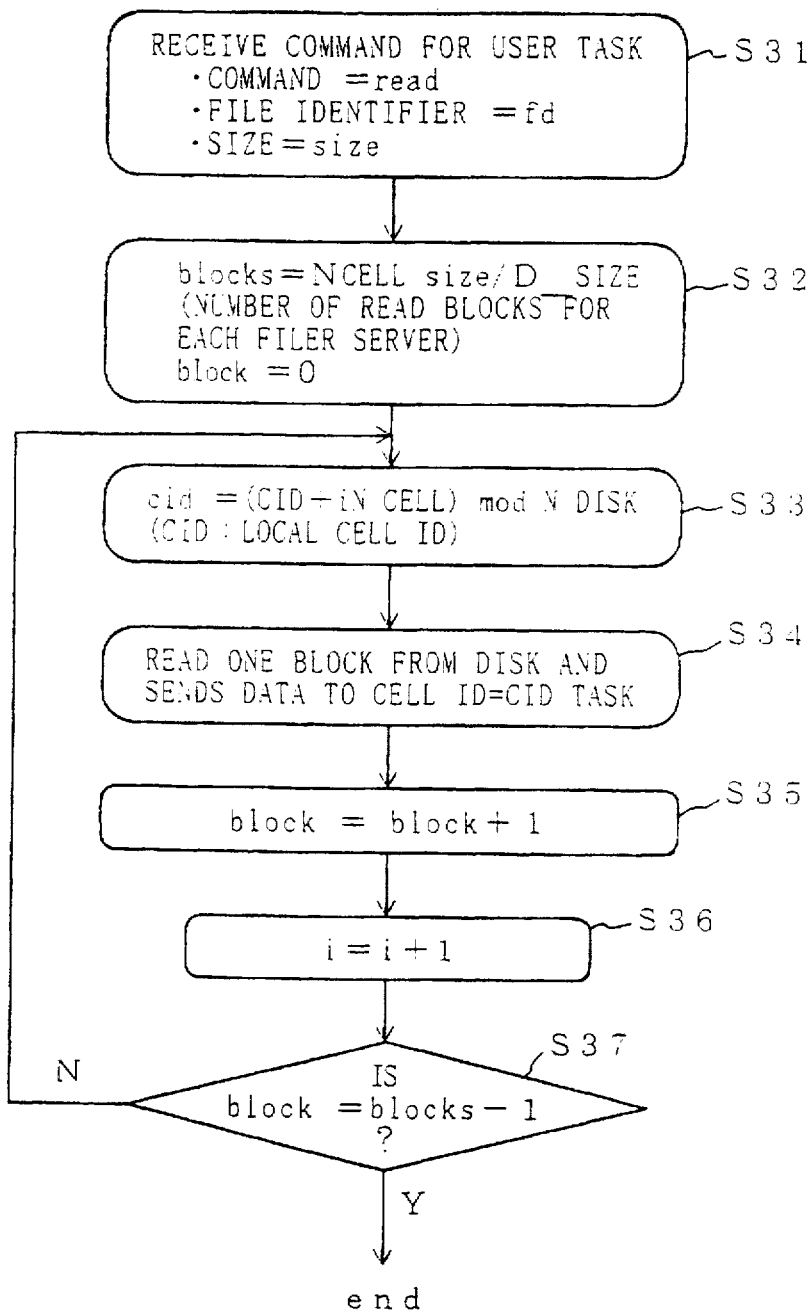
FIG. 16 is a flow chart showing a process of the cell-side file server in the case that data is redistributed.

The cell-side file server 11 receives a command in which the command type is "read", the file identifier is "fd", the data access size of each cell is "size" from the user task (at step S31 of FIG. 16). Thereafter, the number of read blocks of each file server designated by the user task is calculated corresponding to the equation "blocks=NCELL×size/(D_SIZE×NDISK)". In addition, "0" is set as an initial value of the register "block" (at step S32).

Next, the cell ID (CID) of the local cell is multiplied by (i×NCELL). The product is divided by "NDISK" and the remainder is obtained as the receiver IDcid (at step S33). Thus, each cell 10 can know the receiver cell of the data. Data for one block is read from the disk of the local cell and the read data is sent to the cell (ID=cid) (at step S34).

The value of the register "block" is incremented by "1" (at step S35). In addition, the value of the register "i" is incremented by "1" (at step S36). It is determined whether or not the value of the register "register" is equal to the value of which "1" is subtracted from the number of read blocks "blocks" of each file server (at step S37). When the determined result is NO, the flow returns to step S33. At step S33, the next receiver cell ID is calculated. When the determined result at step S37 is YES, the process is completed.

Figure 17A:
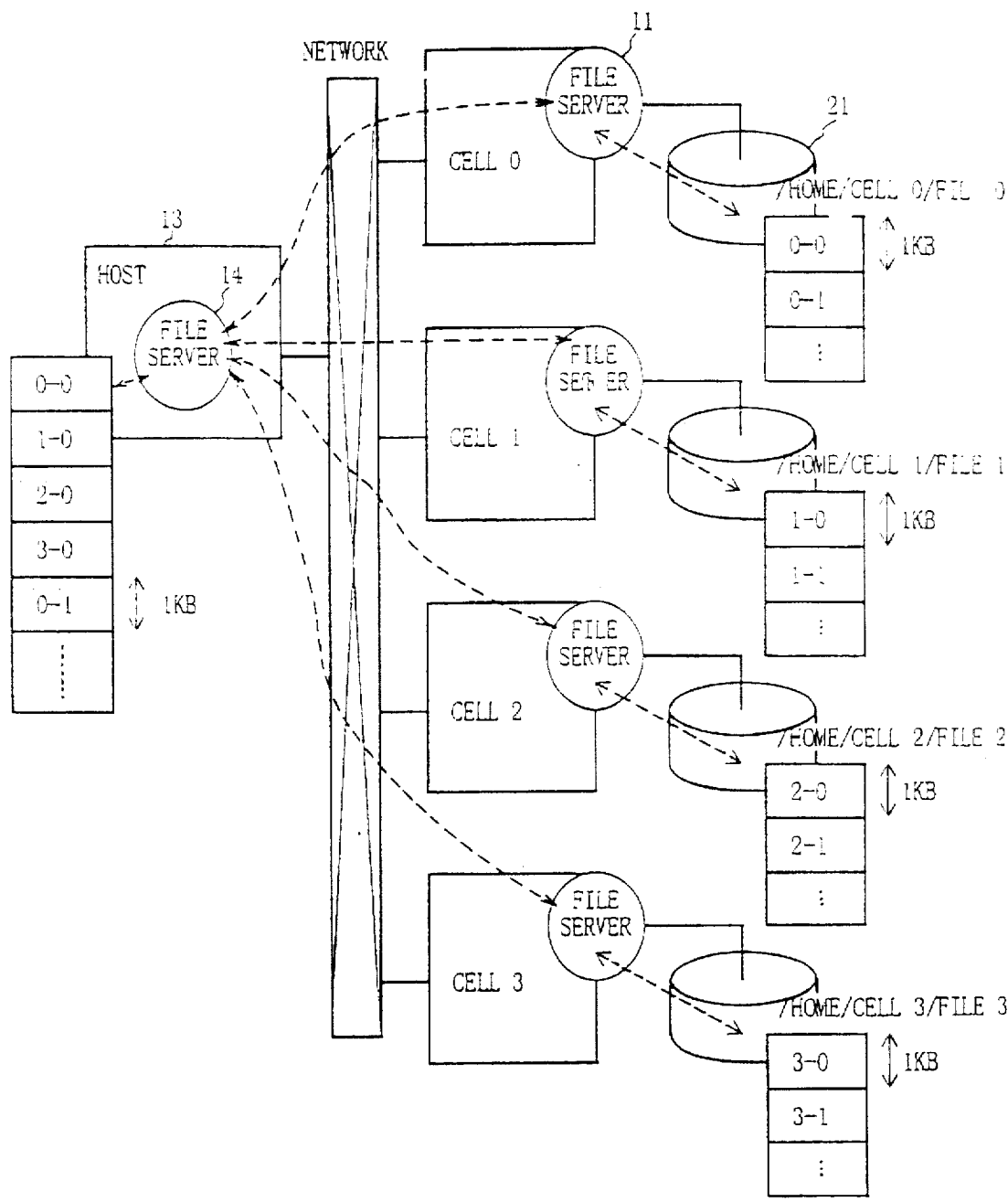
FIG. 17A is a schematic diagram showing software architecture in the case that a substantial file and a local file are independently present.

Next, with reference to FIGS. 17(A) and (B), a process in the case that the host side accesses a file that is distributed to each cell as one file will be described.

In this process, file data is arranged in the disk unit 21 of each cell in a distributing method, a distributing order, and the number of blocks designated by a distribution information file that are the "cyclic", "cell number order", and "1 KB", respectively, as shown in FIG. 17(B).

The first 1 KB data "0-0" of the file is stored in the cell (cell 0). The next 1 KB data "1-0" is stored in the cell (cell 1). The next 1 KB data "2-0" is stored in the cell (cell 2). The next 1 KB data "3-0" is stored in the cell (cell 3). The next 1 KB data "0-1" is stored in the cell (cell 0). In the same manner, data of 1 KB is successively stored in the disc unit 21 of each cell.

The host side knows how the data of the file is distributed to the disk unit 21 of each cell corresponding to the distribution information shown in FIG. 17(B). Thus, when data stored in the disk unit 21 of each cell is read every 1 KB corresponding to the distribution information, the host side can access the data as a global file.

For example, the host-side file server 14 commands the file server 11 of each cell to read data of every 1 KB. By collecting the 1 KB data "0-0" (see FIG. 17(A)) received from the file server 11 of the cell (cell 0), the 1 KB data "1-0" received from the file server 11 of the cell (cell 1), the 1 KB data "2-0" received from the file server 11 of the cell (cell 2), the 1 KB data "3-0" received from the file server 11 of the cell (cell 3), and so forth, the host-side file server 14 can treat these data as one file.

Figure 18:
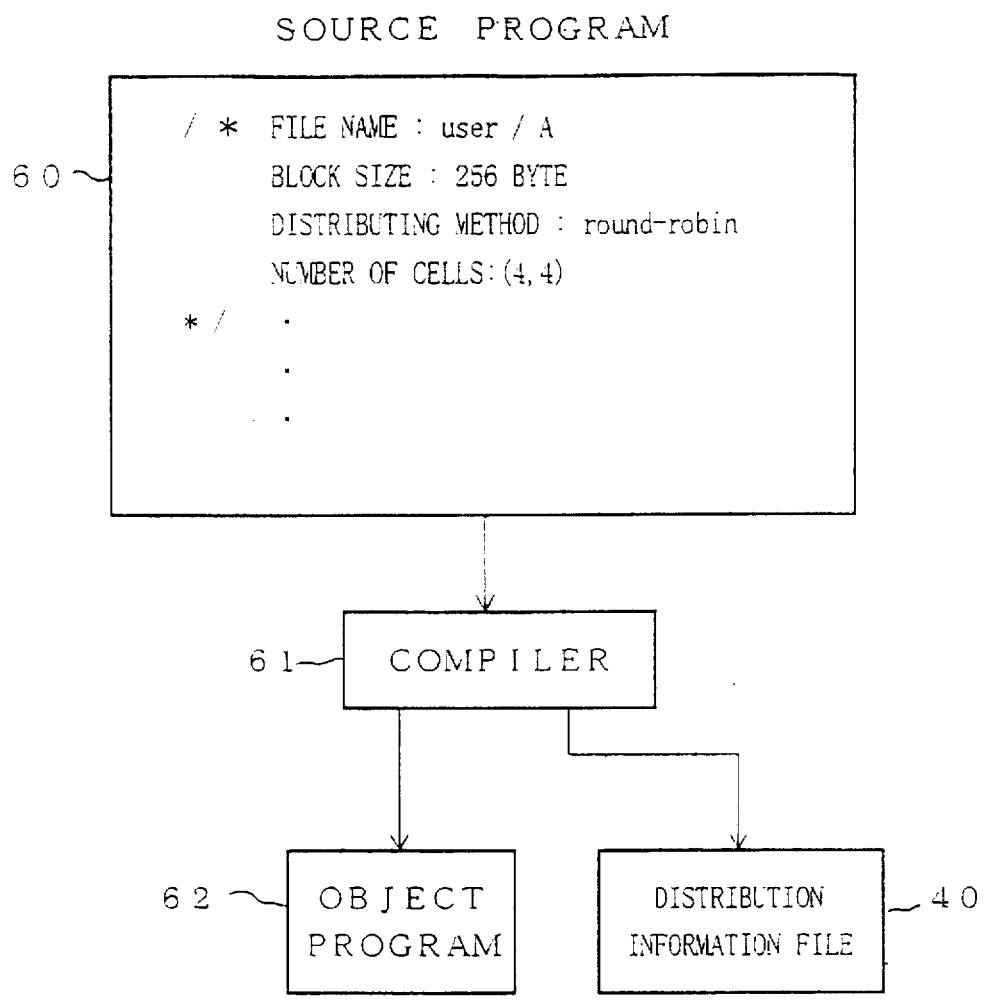
FIG. 18 is a schematic diagram for explaining a method for generating the distribution information file.

FIG. 18 is a schematic diagram showing a method for generating a distribution information file 40. The distribution information file may be separated from an application program. However, as shown in FIG. 18, in a source program 60 of the application program, the file distributing conditions may be designated by the format of a comment text. By an automatic paralleling compiler 61, when the program is complied, the distributing information file can be automatically generated corresponding to the content of the command text.

In other words, when the compiler 61 translates the source program 60 and generates an object program 62, the distribution conditions designated by the comment text in the source program 60 are analyzed and the distribution information file 40 with the analyzed result is automatically generated in a directory designated by the system. Thus, the load of the process for generating the distribution information file 40 can be remarkably reduced.

Figure 19:
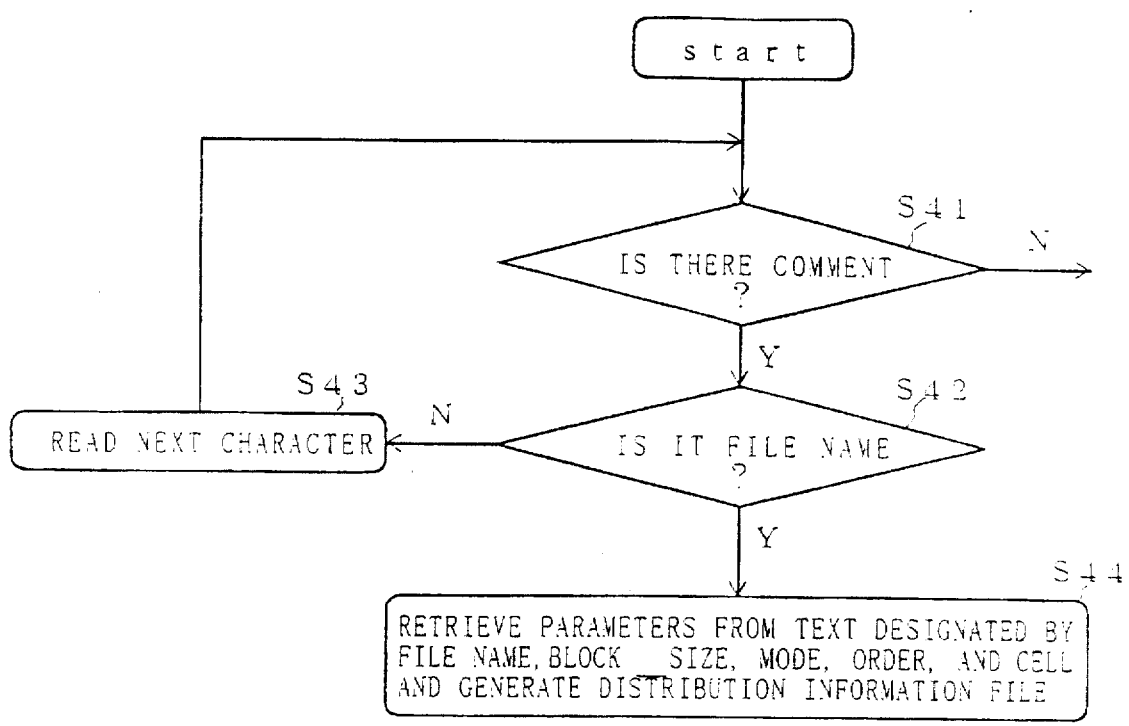
FIG. 19 is a flow chart showing a process for generating a distribution information file corresponding to a comment text.

FIG. 19 is a flow chart showing a program for generating the distribution information file corresponding to the above-described comment text.

It is determined whether or not the comment text is present (at S41 of FIG. 19). When the determined result is YES, it is determined whether or not the read data is a file name (at step S42). When the determined result is NO, the next character is read (at step S43) and the flow returns to step S41. When the determined result at step S42 is YES, a file name, block size, distributing method, and distributing order are retrieved from the comment text and the distribution information file is generated (at step S44).

Figure 20:
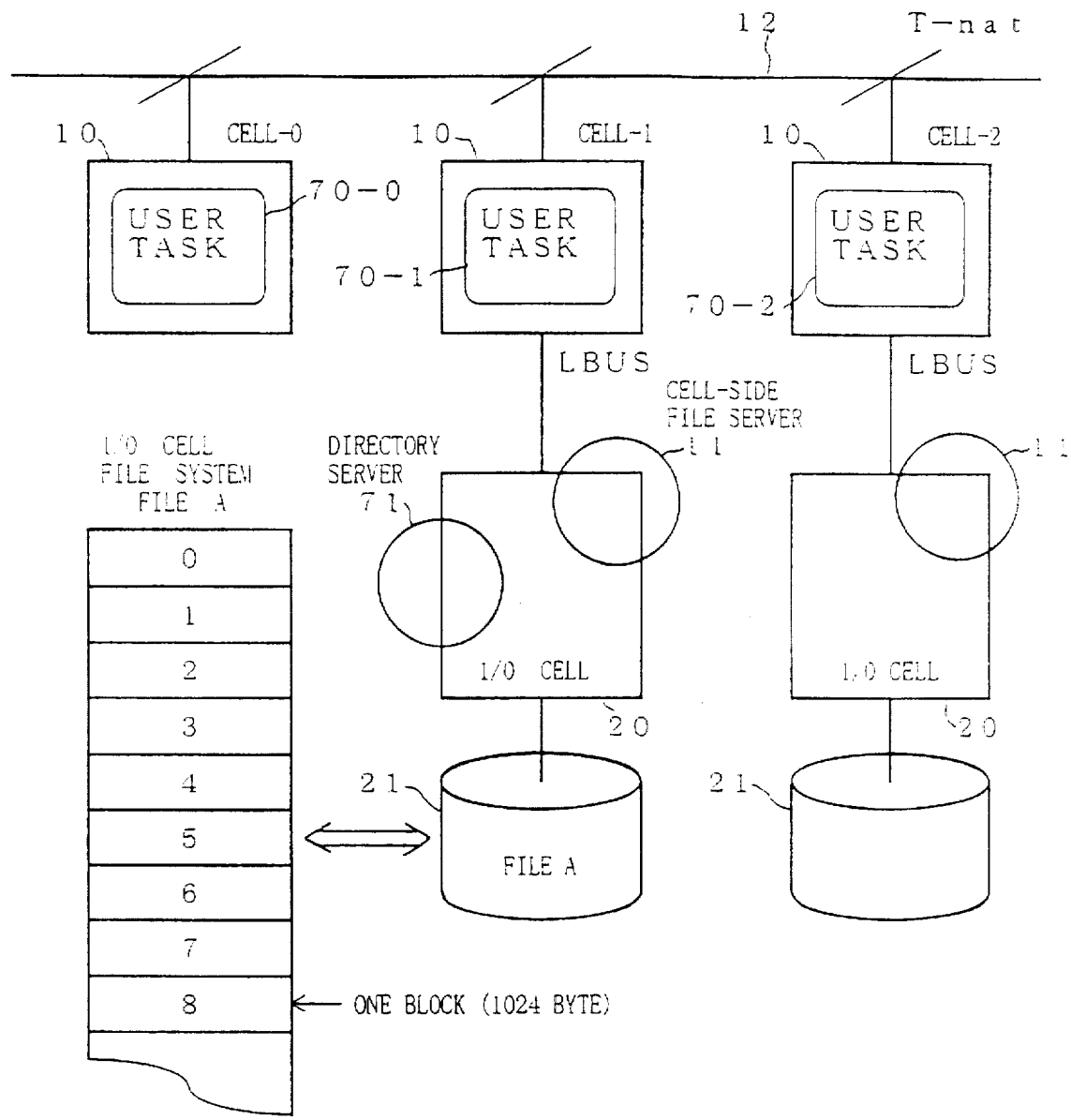
FIG. 20 is a block diagram showing a system construction of a second embodiment of the present invention.

FIG. 20 is a block diagram showing a construction of a system according to a second embodiment of the present invention. Each cell 10 is connected to a torus network (T-Net) 12 so that each cell 10 can operate one or a plurality of user tasks 70. Disk units 21 are connected to part of the cells 10 through I/O cells 20. The I/O cells 20 are options of the disk units 21. A cell-side file server 11 is disposed in each I/O cell 20. The substance of a file may be disposed in the disk unit of the host computer 13 (not shown) or distributed to the disk units 21 of the cell-side file servers 11. The system has one or a plurality of directory servers 71. When the path name of the file is input to the directory server 71, it outputs the access information of the file (the access information represents at what order the substance of the file is distributed to what disk unit 21). Each cell 10 has a library for reading the cell-side file server 11 and the directory server 71.

Next, a process in the case that the substance of a file is distributed to the disk unit 10 of each cell 10 will be described.

Each cell 10 opens a required file. When a user task 70 executes a command for opening the file, it sends information such as a path name, access mode, and open mode to a directory server 71. This access mode is the same as the conventional access mode, which designates the access type such as read, write, and update. The open mode is a parameter that designates the distributing conditions of the file.

The directory server 71 determines whether or not the file can be opened corresponding to the received information. When the determined result is YES, the directory server 71 outputs access information to the requesting side that is a client. The access information represents how the substance is distributed to what disk unit 21. In addition, the directory server 71 outputs access information that is a table that stores such information to the user task 70. This table is referred to as a file descriptor.

The open command format is for example "fd=open (path, access-mode, open-mode)".

When the user task accesses the file, it uses the file descriptor fd. When a file access request takes place, the library on the user task side sends an access request to the related cell-side server 11 corresponding to the file access information and the file open mode.

Figure 21:
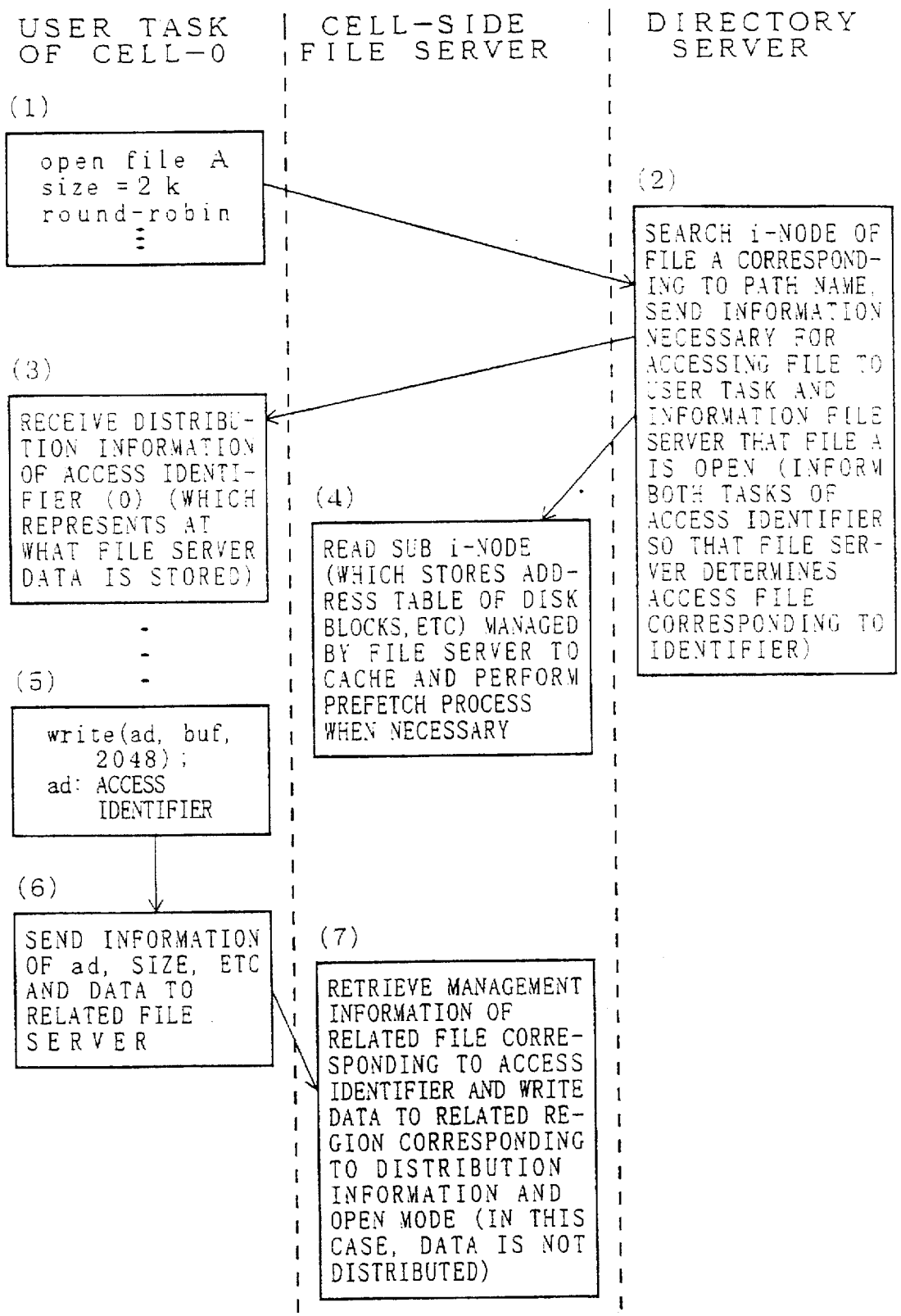
FIG. 21 is a flow chart showing an access process in the case that a user task of each cell issues an access request.

FIG. 21 is a flow chart showing an access process in the case that the user task 70 of each cell 10 issues an access request in the system shown in FIG. 20. In this example, the substance of the file A shown in FIG. 20 is present in the disk unit 21 of the cell (cell-1) 10.

In this access process, the cells (cell-1 and cell-2) 10 open the file in the open mode in which (a) size=2 KB and (b) distributing method=round-robin order and write data for 2048 bytes.

Hereinafter, the open mode is referred to as a mode M0. This system is an SPMD type parallel computer and each cell (cell-0 to cell-2) 10 executes the same program.

Next, with reference to steps (1) to (7) of FIG. 21, the access process will be described.

(1) The user task 70 of the cell 10 opens the file A in the open mode M0.

(2) The directory server 71 searches an i node of the file A (the i node is a control table that manages the file) corresponding to the path name and outputs the information necessary for accessing the file to the user task 70. In addition, the directory server 71 informs the cell-side file server 11 that the file A is open. At this point, the directory server 71 informs the user task 70 and the cell-side file server 11 of the access identifier for determining a file to be accessed.

(3) The user task 70 receives the access identifier and distribution information (that represents at what cell-side file server 11 the required file is stored) from the directory server 71.

(4) The cell-side file server 1 writes a sub i-node (that stores the address table of the disk block of the file A) to a cache memory and performs a pre-fetch process or the like when necessary.

(5) Thereafter, the user task 70 issues a write command with an access identifier, buffer address, and size.

(6) Thus, the access identifier, size, and write data are sent to the related cell-side file server 11.

(7) The cell-side file server 11 obtains the management information of the file A corresponding to the access identifier and writes the data to the related region corresponding to the distribution information and the open mode. In the example shown in FIG. 20, although the file A is not distributed, when it is distributed, write data is sent and written to a related region corresponding to the distribution information.

In the access process, the access identifier is equivalent to the file descriptor. The file descriptor on the user task side has (a) information that represents the substance is stored at what file server group in what order, (b) information that represents the open mode such as size and distributing method, and (c) current access pointer that represents up to what address the file has been read or written.

On the other hand, the cell-side file server 11 manages as the file descriptor (a) information that the user task has and (b) an address table that correlates logical blocks of the file and real blocks of the disk unit.

Figure 22:
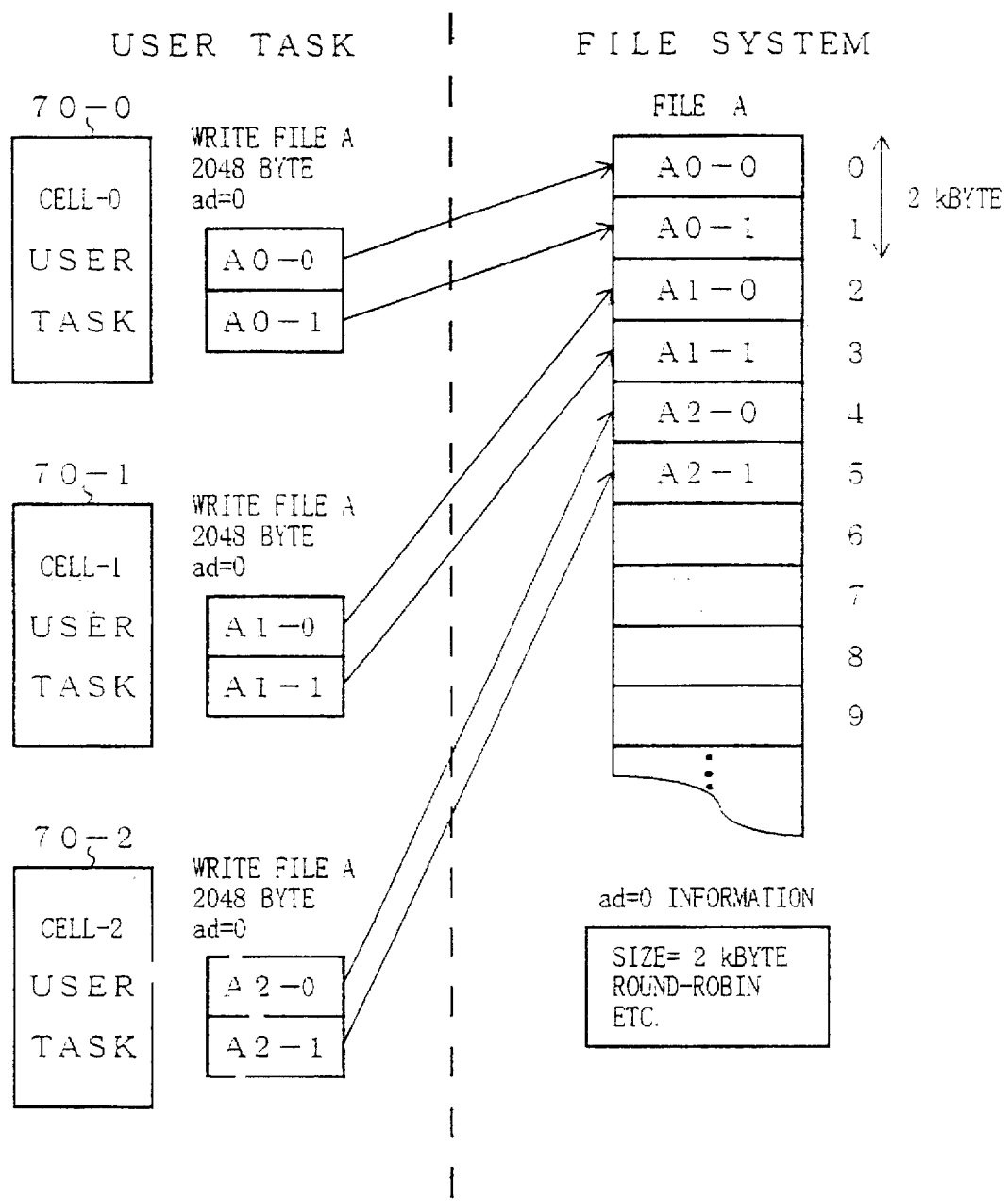
FIG. 22 is a schematic diagram showing an example of data that is stored in a file system.

When the process shown in FIG. 21 is executed, data is stored in the file system as shown in FIG. 22. In other words, since the size is "2 KB" and the distributing method is "round-robin", the data of the user task 70-0 of the cell (cell-0) 10 is written to the first 2 KB of the file A. The data of the user task 70-1 of the cell (cell-1) 10 is written to the next 2 KB of the file A. The data of the user task 70-2 of the cell (cell-2) 10 is written to the next 2 KB. In other words, in the open mode M0, the user task 70-0 can access only portions A0-0 and A0-1 of the file A. The user task 70-1 can access only portions A1-0 and A1-1 of the file A. The user task 70-2 can access only portions A2-0 and A2-1 of the file A.

Next, the cells (cell-1 and cell-2) 10 open the file A in the following open mode and read data for 2048 bytes. Next, this open mode is referred to as mode M1. In the open mode M1, the size is "1 KB" and the distributing method is "round-robin order".

Figure 23:
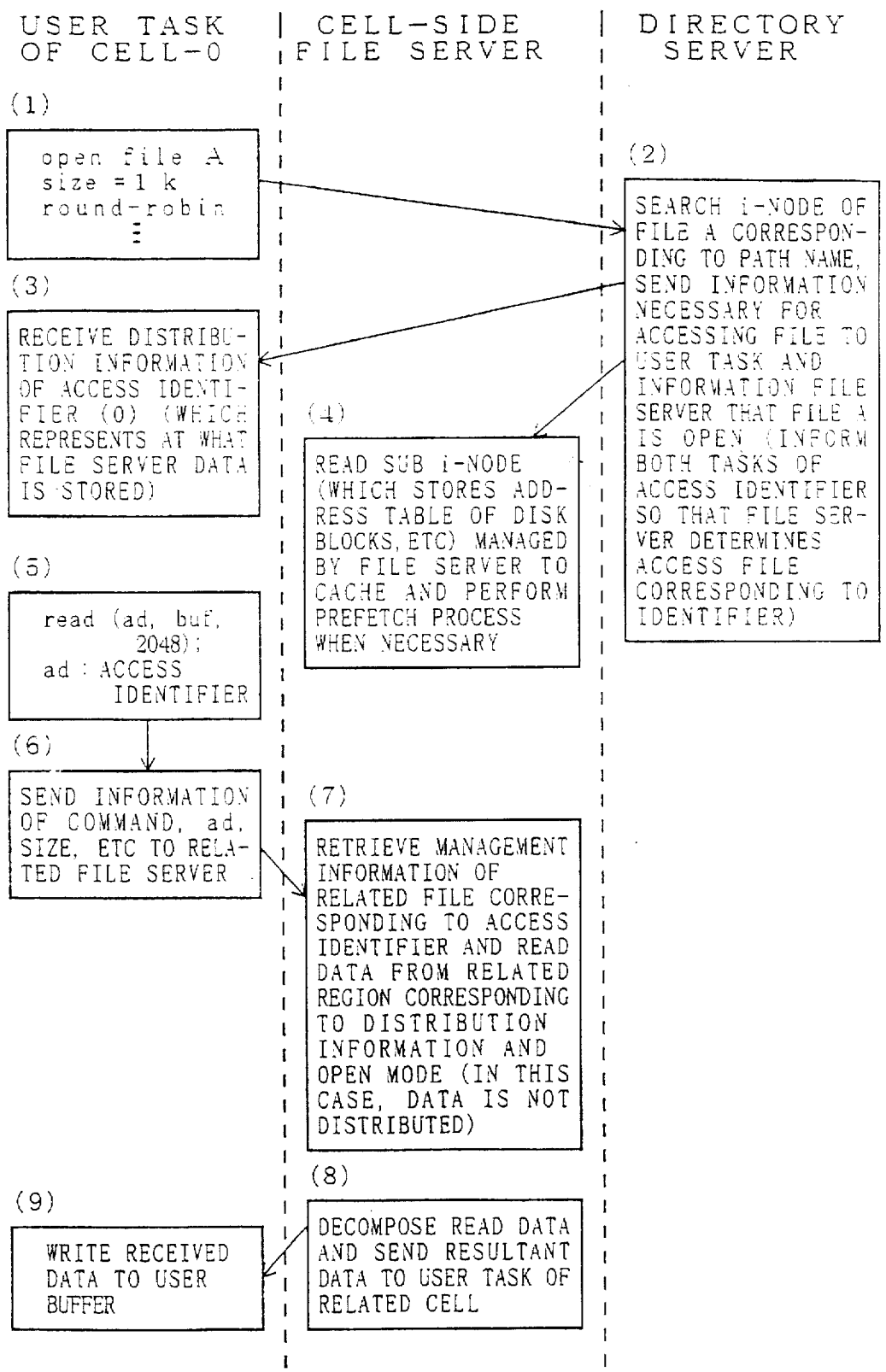
FIG. 23 is a flow chart showing an access process in the case that a user task of each cell issues an access request.

Next, with reference to steps (1) to (9) of FIG. 23, the access process in the open mode M1 will be described.

(1) The user task 70 of the cell 10 opens the file A in the mode M1.

(2) The directory server 71 searches the i node of the file A corresponding to the path name and outputs information necessary for accessing the file to the user task 70. The i node is a control table that manages the file. In addition, the directory server 71 informs the cell-side file server 11 that the file A is open. In addition, the directory server 71 informs the user task 70 and the cell-side file server 11 of the access identifier that determines a file to be accessed.

(3) The user task 70 receives the access identifier and the distribution information (that represents at what cell-side file server the file necessary is stored) from the directory server 71.

(4) The cell-side file server 11 reads a sub i node (that stores an address table of the disk block of the file A) to a cache memory and performs a pre-fetch process when necessary.

(5) The user task 70 issues a read command with an access identifier, buffer address, and size. In this case, the distributing block size is "1 KB" and the read data size is "2 KB".

(6) Thus, the information of such as the required command, the access identifier, and the size is sent to the related cell-side file server 11.

(7) The cell-side file server 11 obtains the management information of the file A corresponding to the access identifier and reads data from the related region corresponding to the distribution information and the open mode. In the example shown in FIG. 20, although the file A is not distributed, when it is distributed, the cell-side file server 11 requests the related cell-side file server 11 to read data corresponding to the distribution information.

(8) After the data has been read, the data is discomposed and sent to the user task 70 of the cell 10.

(9) The user task 70 writes the received data to the user buffer. Thus, the read process is completed.

Figure 24:
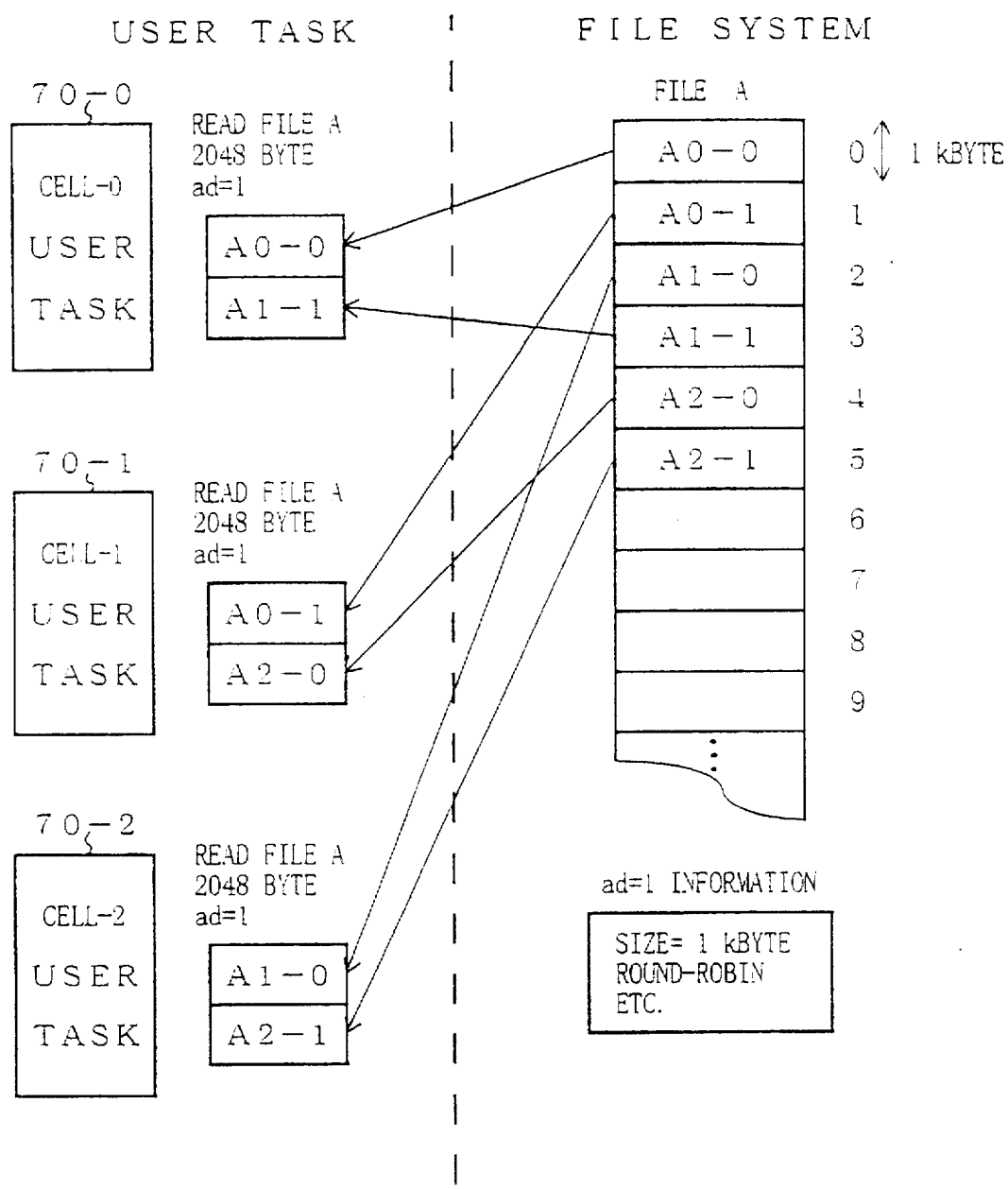
FIG. 24 is a schematic diagram showing an example of data that is read from the file system.

FIG. 24 is a block diagram showing data that is read from the file system to user tasks 70-1 and 70-2 of cells 10 corresponding to the process shown in FIG. 24. In this process, the distribution size is "1 KB", the distributing method is "round robin", and the read size is "2 KB". Thus, portions A0-0 and A1-1 of the file A are read to the user task 70-0 of the cell (cell-0) 10. Portions A0-1 and A2-0 of the file A are read to the user task 70-1 of the cell (cell-1) 10. Portions A1-0 and A2-1 of the file A are read to the user task 70-2 of the cell (cell-2) 10. In other words, in the open mode M1, the user task 70-0 can access only the portions A0-0 and A1-1 of the file A. The user task 70-1 can access only the portions A0-1 and A2-0 of the file A. The user task 70-2 can access only the portions A1-0 and A2-1 of the file A.

In addition, the cells (cell-0 to cell-2) 10 changes the open mode as follows and write data for 1024 bytes. Hereinafter, this open mode is referred to as an open mode M2. In this open mode, the size is "1 KB" and the distributing method is "round-robin order".

Next, with reference to steps (1) to (6) of FIG. 25, the access process in the open mode M2 will be described.

(1) The user task 70 of the cell 10 issues a command that changes the open mode M0 to the open mode M2 (modify access mode) for the file A (access identifier=0).

(2) The directory server 71 changes the open mode information for the file A (access identifier=0) managed by the local server to the designated mode.

(3) The cell-side file server 11 corrects the open mode information for the file A (access identifier=0) managed by the local server.

(4) Thereafter, the user task 70 issues a write command with the access identifier, buffer address, and size "1024 bytes".

(5) Thus, the access identifier, the size, and the write data are sent to the related cell-side file server 11.

(6) The cell-side file server 11 obtains the management information of the related file A corresponding to the access identifier and writes the data to the related region corresponding to the distribution information and the open mode.

Figure 25:
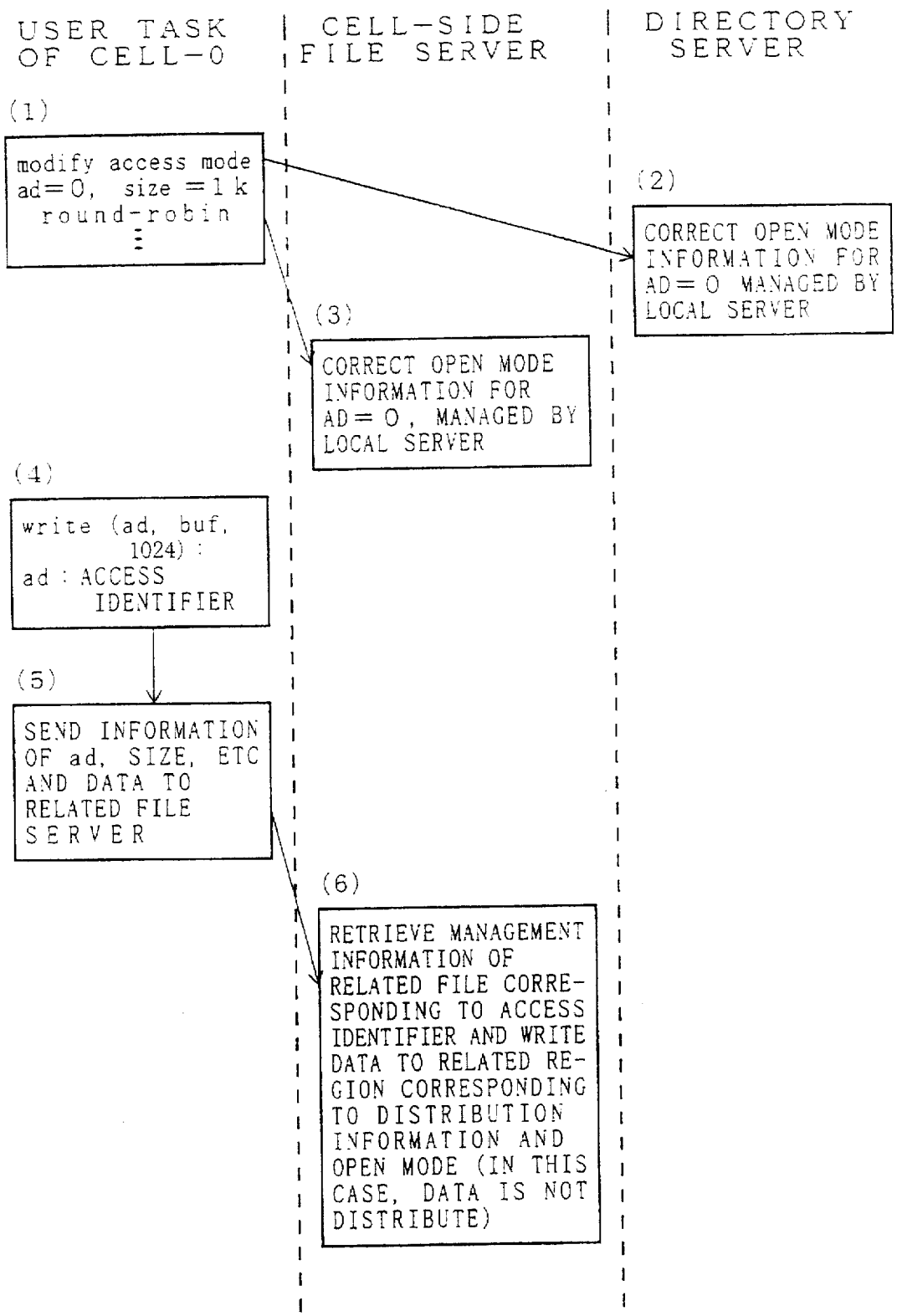
FIG. 25 is a flow chart showing an access process in the case that a user task of each cell issues an access request.
Figure 26:
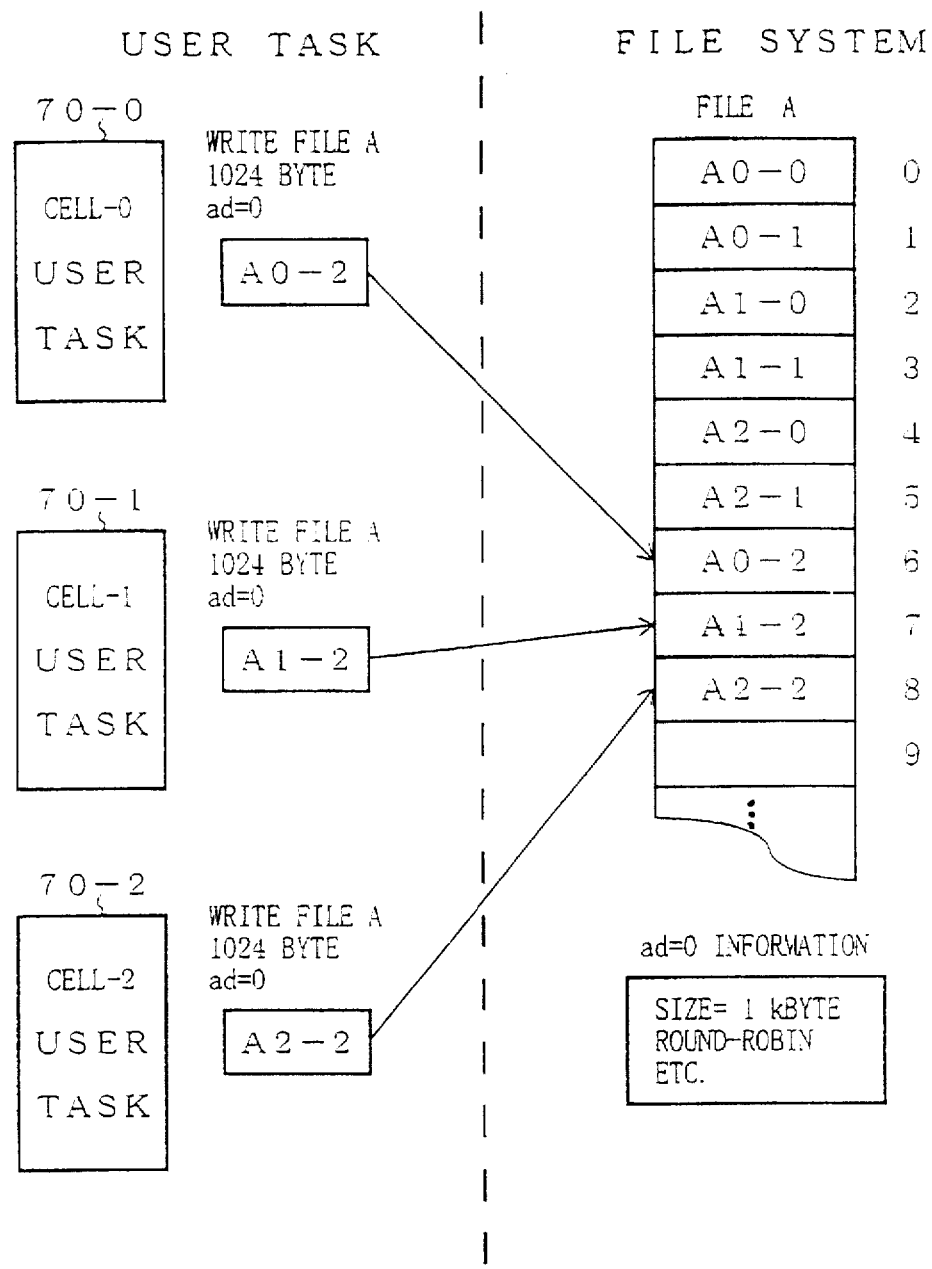
FIG. 26 is a schematic diagram showing an example of data stored in the file system.

When the process shown in FIG. 25 is executed, data is stored in the file system as shown in FIG. 26. In other words, in the open mode M2, since the distribution size and the write size are "1 KB" each and the distributing method is "round-robin", data of the user task 70-0 of the cell (cell-0) 10 is written to a portion A0-2 of the file A shown in FIG. 26. The data of the user task 70-1 of the cell (cell-1) 10 is written to a portion A1-2 of the file A. The data of the user task 70-2 of the cell (cell-2) 10 is written to a portion A2-2 of the file A.

In the above-described embodiments, data is distributed block by block. However, data can be distributed as smaller blocks of for example 10 words. In the description of the access process, for simplicity, the substance was stored under the control of one cell-side file server 11. However, even if the substance is distributed to a plurality of cells 10, data can be accessed corresponding to the distribution information.

It should be noted that the present invention is not limited to the SPMD model program. Instead, the present invention can be applied to a conventional programming model. According to the present invention, a flexible file system can be accomplished.

When the SPMD model program is executed, the following effects can be obtained.

(a) A user task of each cell can retrieve only a required portion from data throughput without any special consideration.

(b) Although data distribution conditions depend on the number of executing cells, the executing task, and/or the file for use, data can be distributed in any distribution pattern corresponding to the setting of the distribution information file that stores the distribution information of each file.

(c) In addition, since a data file written by each cell is collected as a continuous file by setting the distribution information file, the collected data can be accessed from the host computer.

(d) When a file is opened in a plurality of open modes at the same time and accessible re regions as local files are varied corresponding to these open modes, an optimum distribution process can be accomplished corresponding to a data process for use. For example, in a process such as simulation, when there are data write task and data display task, the data amount thereof that can be handled in real time varies each other. However, these tasks can be distributed with optimum data amount.

(e) In addition, when the open mode is dynamically changed, each cell can flexibly process data distributed in various manners with no change or a minor change of process logic.

As described above, according to the present invention, in the distribution file system for use with the parallel computer system, data distribution to each cell can be freely changed. In addition, since the same file can be accessed with advantages of a global file and a local file, the load of the process of the application can be remarkably reduced.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A distribution file system for use with a parallel computer system in which a host computer and a plurality of cells are connected through a network, each of the cells having a command executing function, the distribution file system comprising:

a plurality of file storing means for storing a data of a file;

distribution information storing means for storing distribution information that represents how the data of said file are arranged while distributed in said plurality of file storing means;

first access means for accessing as a single file, the data of the file stored while distributed in said plurality of file storing means according to said distribution information; and second means access means for accessing as a local file, the data of a part of the file stored in at least one of said plurality of file storing means according to said distribution information.

2. The distribution file system as set forth in claim 1, wherein the distribution information is composed of block size of the data of the file distributed to each cell, data distributing method, and distributing order.

3. The distribution file system as set forth in claim 1, further comprising distribution information generating means for automatically generating the distribution information when a program for managing the file is compiled.

4. The distribution file system as set forth in claim 1, further comprising an open mode for designating distribution conditions different from those designated by the distribution information.

5. The distribution file system as set forth in claim 1, further comprising an open mode for designating distribution conditions different from those designated by the distribution information, wherein said second access means is adapted for accessing the file as different local files corresponding to distribution conditions of different open modes designated by a task for the same file.

6. The distribution file system as set forth in claim 1, wherein:

said plurality of file storing means includes host-side file storing means connected to said host computer and a plurality of cell side file storing means connected to said plurality of cells;

said first access means is provided in said host side computer, and accesses as the single file, the data of the file arranged while distributed in said plurality of cell side file storing means; and said second access means is provided in each of said plurality of cells, and accesses as the local file, the data of a part of the file stored in said cell side file storing means.

7. The distribution file system as set forth in claim 1, further comprising:

re-distribution information storing means for storing distribution conditions of a data designated by an access request of a task as re-distribution information, the access request having distribution conditions of the data of the file, wherein:

the second access means transmits data requested for re-distribution by said task and stored in a cell side file storing means corresponding to another cell side file storing means, according to said distribution information and said re-distribution information, thereby re-distributing the data of the file.

8. A distribution file system for use with a parallel computer system having a host computer, a first storing unit, a host-side file server for managing a first file stored in the first storing unit, a plurality of cells having a command executing function, a plurality of second storing units, and a plurality of cell-side file servers for managing a second file distributed to the second storing units, the host computer and the cells being connected through a network, wherein one of the first and second storing units is adapted for storing distribution information that represents how the data of the first and second files are distributed; and wherein the cell-side file server has second access means for accessing the second file as a local file composed of only one data required by a task corresponding to distribution conditions designated by the task and the distribution information.

9. A distribution file system for use with a parallel computer system in which a host computer and a plurality of cells are connected through a network, each of the cells having a command executing function, the distribution file system comprising:

a plurality of file storing means for storing data of a file;

first access means for accessing data of said file stored while distributed in the plurality of file storing means as a single file; and second access means for accessing data of a part of said file stored in at least one of said plurality of file storing means as a local file.

10. The distribution file system as set forth in claim 9, wherein:

said plurality of file storing means includes host-side file storing means connected to said host computer and a plurality of cell side file storing means connected to said plurality of cells;

said first access means is provided in said host-side computer, and accesses as the single file, the data of the file arranged while distributed in said plurality of cell side file storing means; and said second access means is provided in each of said plurality of cells, and accesses as the local file, the data of a part of the file stored in said cell side file storing means.

11. A distribution file system for use with a parallel computer system in which a host computer and a plurality of cells are connected through a network, each of the cells having a command executing function, the distribution file system comprising:

a host-side file storing unit connected to said host computer;

a plurality of cell side file storing units, connected to said plurality of cells, for storing a data of a file;

a host-side file server for controlling said host-side file storing unit; and a plurality of cell side file servers for controlling said plurality of cell side storing units, wherein:

said host-side file storing unit is provided with a distribution information storing unit for storing distribution information that represents how the data of said file is stored while distributed in said plurality of cell side file storing units;

said host-side file server is provided with a first access unit for accessing as a single file, the data of the file arranged while distributed in said plurality of cell side file storing units according to said distribution information; and said plurality of cell side file servers are provided with a second access unit for accessing as a local file, the data of a part of said file stored in one of said plurality of file storing units according to said distribution information.

12. The distribution file system as set forth in claim 11, wherein the distribution information is composed of the block size of the data of the second file distributed to each cell, data distributing method, and distributing order.

13. The distribution file system as set forth in claim 11, further comprising a mode for designating distribution conditions different from those designated by the distribution information.

14. The distribution file system as set forth in claim 11, further comprising:

a re-distribution information storing unit for storing distribution conditions designated by said task as re-distribution information, in the case where said task designates new distribution conditions regarding the data of said file and requires for access requirement, wherein:

said second access means is adapted for accessing the data of a part of the file required by said task as the local file, from corresponding said cell side storing unit according to said distribution information and said re-distribution information.

* * * * *

UNITED STATES PATENT AND TRADEMARK OFFICE
CERTIFICATE OF CORRECTION

PATENT NO. : 5,761,498

DATED : June 2, 1998

INVENTOR(S) : Ooe et al.

It is certified that error appears in the above-identified patent and that said Letters Patent is hereby corrected as shown below:

Col. 7, line 55, delete "is".

Signed and Sealed this

Tenth Day of November 1998

Attest:

BRUCE LEHMAN

*Attesting Officer*　　　　*Commissioner of Patents and Trademarks*